(12) United States Patent
Basler et al.

(10) Patent No.: US 9,637,038 B2
(45) Date of Patent: May 2, 2017

(54) CONTINUOUS ROD TRANSPORT SYSTEM

(71) Applicant: Weatherford/Lamb, Inc., Houston, TX (US)

(72) Inventors: Hermann Basler, Alberta (CA); Jonathan Paul Penner, Alberta (CA)

(73) Assignee: Weatherford Technology Holdings, LLC, Houston, TX (US)

( * ) Notice: Subject to any disclaimer, the term of this patent is extended or adjusted under 35 U.S.C. 154(b) by 107 days.

(21) Appl. No.: 14/502,395

(22) Filed: Sep. 30, 2014

(65) Prior Publication Data

US 2015/0016915 A1  Jan. 15, 2015

Related U.S. Application Data

(60) Division of application No. 12/912,848, filed on Oct. 27, 2010, now Pat. No. 8,869,580, which is a
(Continued)

(51) Int. Cl.
*B60P 7/08* (2006.01)
*B60P 3/035* (2006.01)
(Continued)

(52) U.S. Cl.
CPC .............. *B60P 3/035* (2013.01); *B21C 47/04* (2013.01); *B21C 47/24* (2013.01); *B21C 47/28* (2013.01); *B65H 49/38* (2013.01); *B65H 75/20* (2013.01); *B65H 75/22* (2013.01); *B65H 75/364* (2013.01); *B65H 75/4402* (2013.01);
(Continued)

(58) Field of Classification Search
CPC ....... B60P 3/035; E21B 19/22; E65H 75/4402

USPC .... 410/32, 33, 42, 44, 46–48; 242/129, 398, 242/401, 128, 610.5, 570, 577, 613,
(Continued)

(56) References Cited

U.S. PATENT DOCUMENTS 3,186,659 A   6/1965  Arnold
3,254,851 A   6/1966  Caperton
(Continued)

FOREIGN PATENT DOCUMENTS

AU    2008100774    10/2008
CA        885866    11/1971
(Continued)

OTHER PUBLICATIONS

Partial European Search Report from EP appl. No. EP 10251670, dated Dec. 16, 2010.
(Continued)

*Primary Examiner* — Stephen Gordon
(74) *Attorney, Agent, or Firm* — Blank Rome LLP

(57) ABSTRACT

A transport system has a dedicated trailer for transporting a small transport reel (i.e., <18-ft in diameter) of continuous rod to the field. The trailer has a pedestal that can pivot the reel. A hub motor on the pedestal can turn the reel, and a transfer unit and rod bender on the trailer can curve or straighten the rod when being fed into or out of the reel. A power and hydraulic system operates the various hydraulic components on the trailer. In other aspects, the transport system includes stands that can hold the small transport reels on a trailer within a defined transport envelope. When empty, these stands can be stacked on top of one another on the trailer for return to a facility.

30 Claims, 26 Drawing Sheets

Related U.S. Application Data continuation-in-part of application No. 12/568,053, filed on Sep. 28, 2009, now Pat. No. 8,864,428.

(51) Int. Cl.
| | | |
|---|---|---|
| *B21C 47/04* | (2006.01) | |
| *B21C 47/24* | (2006.01) | |
| *B21C 47/28* | (2006.01) | |
| *B65H 49/38* | (2006.01) | |
| *B65H 75/20* | (2006.01) | |
| *B65H 75/22* | (2006.01) | |
| *B65H 75/36* | (2006.01) | |
| *E21B 19/22* | (2006.01) | |
| *B65H 75/44* | (2006.01) | |

(52) U.S. Cl.
CPC .......... *E21B 19/22* (2013.01); *B65H 2701/33* (2013.01); *B65H 2701/534* (2013.01)

(58) Field of Classification Search
USPC ........... 242/594.1, 598.6, 157 R, 604.1, 605; 137/355.12, 355.26
See application file for complete search history.

(56) References Cited

U.S. PATENT DOCUMENTS

| | | | |
|---|---|---|---|
| 3,491,967 A | 1/1970 | Sawyer et al. | |
| 3,504,866 A | 4/1970 | Palynchuk et al. | |
| 3,559,905 A | 2/1971 | Palynchuk | |
| 3,627,224 A | 12/1971 | Diggs | |
| 3,655,218 A | 4/1972 | Taylor | |
| 3,923,469 A | 12/1975 | Palynchuk | |
| 4,325,521 A | 4/1982 | Homersham | |
| 4,471,651 A | 9/1984 | Dimeff et al. | |
| 4,673,035 A | 6/1987 | Gipson | |
| 4,767,073 A | 8/1988 | Malzacher | |
| 4,945,938 A | 8/1990 | Ponsford et al. | |
| 5,215,272 A | 6/1993 | Sauber | |
| 5,404,757 A | 4/1995 | Soulard | |
| 5,676,327 A | 10/1997 | Wittrisch | |
| 6,227,397 B1 | 5/2001 | Kim | |
| 6,347,761 B1 | 2/2002 | Larson | |
| 6,481,082 B1 | 11/2002 | Widney et al. | |
| 8,157,491 B2 * | 4/2012 | Pavlov | E01F 13/022 410/46 |
| 8,864,428 B2 * | 10/2014 | Basler | B65H 75/20 410/48 |
| 8,869,580 B2 * | 10/2014 | Basler | B21C 47/04 72/183 |
| 2006/0150384 A1 | 7/2006 | Labonte et al. | |
| 2007/0125551 A1 | 6/2007 | Havinga | |
| 2008/0196235 A1 | 8/2008 | Gereluk | |
| 2011/0073552 A1 | 3/2011 | Basler et al. | |

FOREIGN PATENT DOCUMENTS

| | | |
|---|---|---|
| DE | 2006840 A1 | 9/1971 |
| DE | 2333435 A1 | 1/1975 |
| DE | 20019547 U1 | 3/2001 |
| EP | 0266206 A1 | 5/1988 |
| FR | 2342865 | 9/1977 |
| FR | 2707221 | 1/1995 |
| WO | 2010/019047 A2 | 2/2010 |

OTHER PUBLICATIONS

EPO Machine Translation of DE 2333435, obtained from http://tranlationportal.epo.org.
EPO Machine Translation of DE 2006840, obtained from http://tranlationportal.epo.org.
Search Report from EP Appl. No. EP 10251670.5, dated Jun. 20, 2011.
Australian Search Report for Application No. 2010219302, dated Jul. 19, 2011.
Extended European Search Report in counterpart European Appl. No. EP11186976, dated Sep. 4, 2013.
Partial European Search Report in counterpart European Appl. No. EP11186976, dated Apr. 24, 2013.
First Office Action in counterpart Canadian Appl. 2,756,358, dated May 28, 2013.
First Examination Report in counterpart Australian Appl. 2011236064, dated Aug. 29, 2013.
First Office Action in counterpart Canadian Appl. 2,756,358, dated Dec. 19, 2013.
Pro-Rod, Booklet, "The World's Technical Leader in Coiled Sucker Rod Manufacturing," dated Apr. 1, 2006.
Pro-Rod, "Pro-Rod—Services—Transportation," obtained from www.prorod.com/transportation.htm, generated Aug. 26, 2009, copyright 2008.
Weatherford, Brochure, "Weatherford Sucker Rods—Choices in Technology for Your Sucker-Rod Needs," copyright 2003-2009.
Weatherford, Brochure, "COROD—Continuous Sucker Rod," copyright 1999-2009.

\* cited by examiner

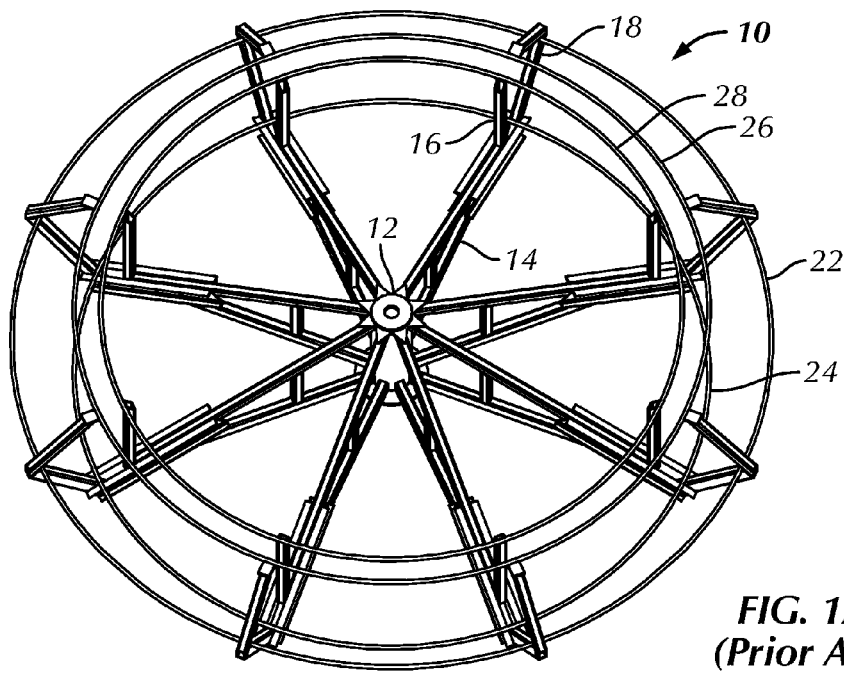
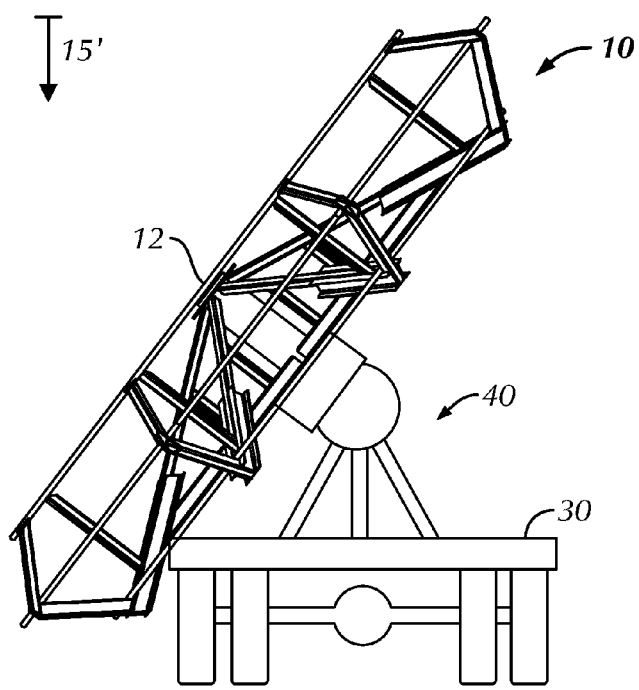
FIG. 1A
*(Prior Art)*
FIG. 1B
*(Prior Art)*

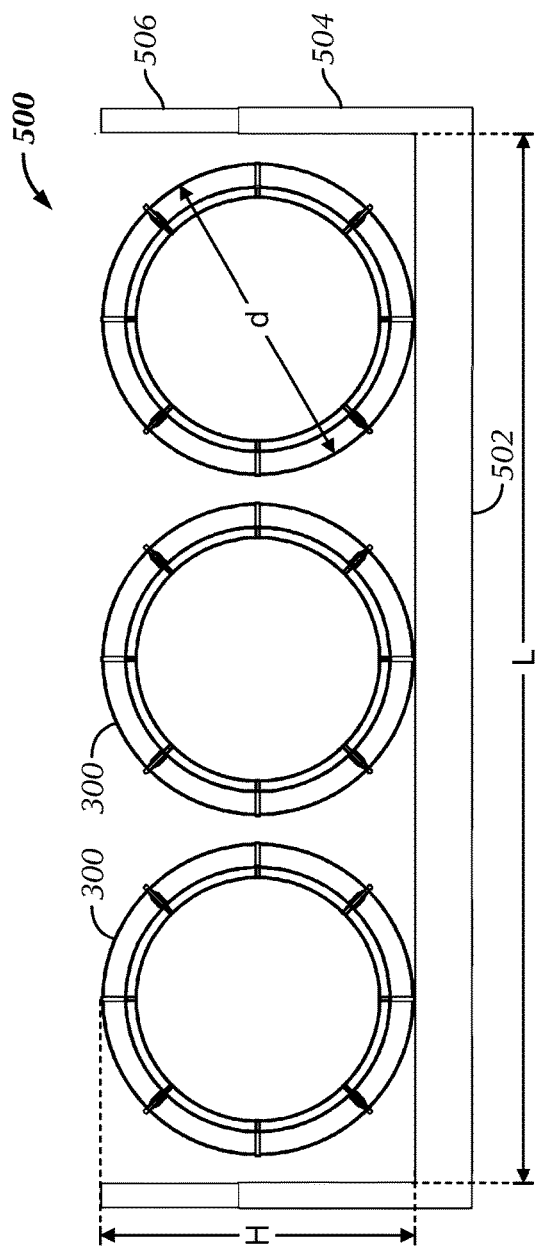
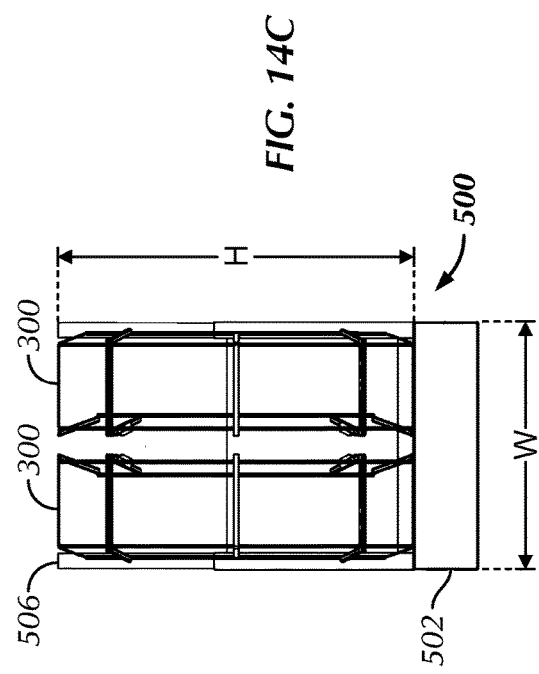
FIG. 14B
FIG. 14C

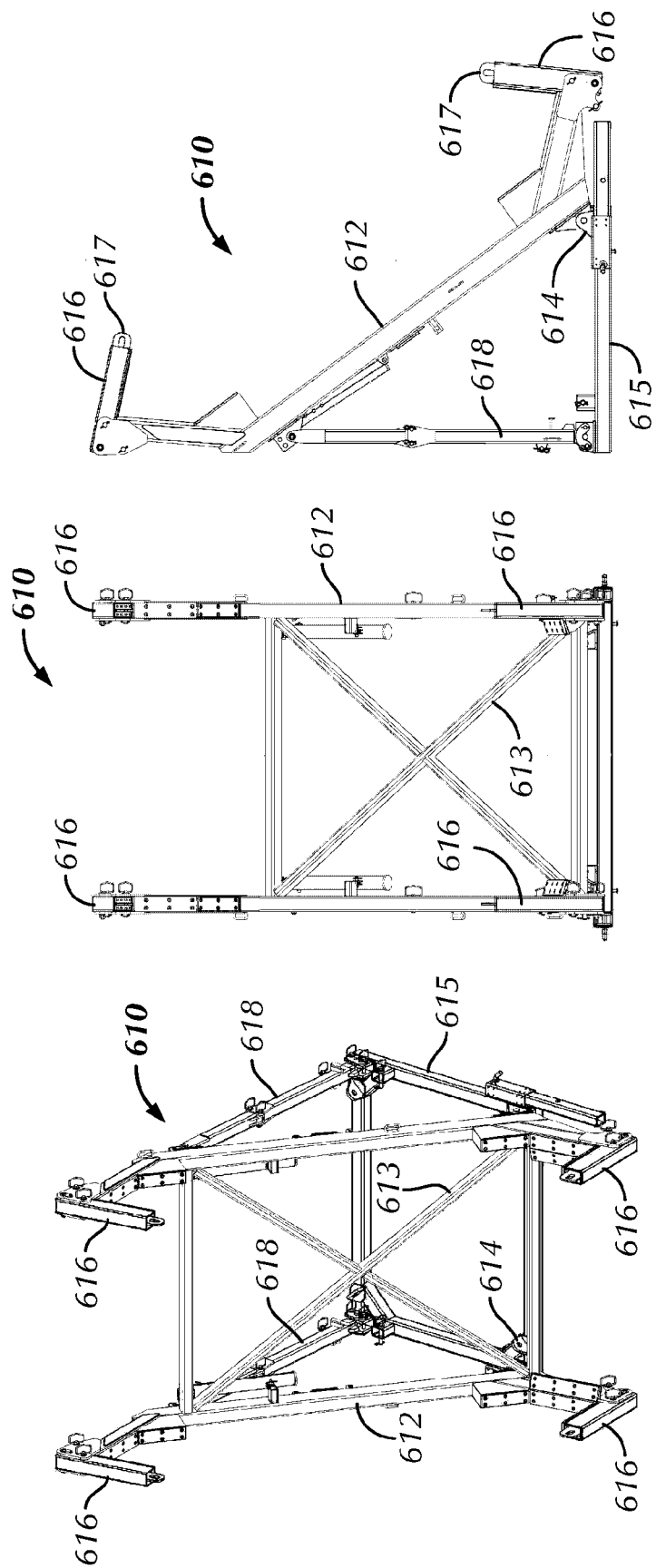

CONTINUOUS ROD TRANSPORT SYSTEM

CROSS-REFERENCE TO RELATED APPLICATIONS

This is a divisional of U.S. patent application Ser. No. 12/912,848, filed 27 Oct. 2010, now U.S. Pat. No. 8,869,580, which is continuation-in-part of U.S. patent application Ser. No. 12/568,053, filed 28 Sep. 2009, now U.S. Pat. No. 8,864,428, which are both incorporated herein by reference and to which priority is claimed.

BACKGROUND

Continuous rod is a long string of hardened, solid steel rod. The continuous rod was developed nearly 30 years ago for reciprocating pump applications where multiple-coupled sucker rods were typically used. Unlike separate sucker rods that couple together every 25 or 30-ft, the continuous rod only requires couplings at the top and bottom of the rod string. An early example of a unitary steel sucker rod string is disclosed in U.S. Pat. No. 3,923,469, which is incorporated herein by reference.

Today, operators can use continuous rod, such as the COROD® brand of continuous sucker rod, for artificial lift systems, pump applications, and other well operations. (COROD is a registered trademark of Weatherford/Lamb, Inc.) The continuous rod (also called continuous sucker rod or coiled sucker rod) can be manufactured to almost any desired length. The rod is typically heat treated to a tensile strength of about 110-ksi, which corresponds to a Rockwell hardness value of about 26-HRc. Any hardness value above this may result in increased corrosion in an $H_2S$ environment.

The cross-section of the rod can be round or elliptical and can range in size from about 12/16-in to about 18/16-in. Both the round and elliptical rods can be used for reciprocating rod-pumping applications, but the round rod is better suited for rotary-type rod-pumping applications. Today, round rod is a necessary component to meet the high torsional needs of progressing cavity pumps. In fact, most of the continuous rod produced today has a round cross-section, and the demand for larger diameter rod continues to increase.

Due to its length, the continuous rod is coiled for storage and transport on a spool or reel. An early example is such a reel is disclosed in U.S. Pat. No. 3,504,866, which is incorporated herein by reference. For purposes of discussion, FIG. 1A reproduces a conventional transport reel 10 used for storing and transporting coiled rod. The reel 10 has a hub 12 with arms 14 extending outward therefrom. Bars 16/18 connected to each of the arms 14 extend upwards, and wire rings 22/24/26/28 interconnect the bars 16/18 together. A length of continuous rod (not shown) can be coiled in (and uncoiled from) the bars 16/18 as the reel 10 is rotated about the hub 12. This conventional reel 10 has a diameter of 18-ft, which is the standard throughout the industry.

As noted previously, continuous rod was originally developed to operate reciprocating downhole pumps. Because the continuous rod only needed to support reciprocating motion for these pumps, the rod did not require a specific cross-section. Therefore, manufacturers chose an elliptical cross-section for the rod, such as disclosed in U.S. Pat. No. 3,923,469. This elliptical cross-section ensured that the rod could be easily coiled on a reel without excessive bending stresses and then straighten itself after it was uncoiled.

The elliptical rod was used for a long time exclusively in North America and mainly in Canada. Accordingly, manufacturers configured a reel with an 18-ft (216-in) diameter based on Canada's transport regulations to store and transport rod. This 18-ft diameter reel, such as disclosed in U.S. Pat. No. 3,504,866, was large enough for coiling the rod on the reel 10 without permanent deformation, but was small enough to facilitate transporting the reel 10 under Canada's regulations.

Later, downhole rotary pumps were developed. Because these pumps are operated by rotation, the continuous rod used for these pumps needed a more round cross-section to handle torque. Naturally, manufacturers began storing and transporting this round rod on the 18-ft diameter reels 10 already existing in inventory. When coiled on these existing reels 10, however, the round rod experienced much higher bending stresses, and the outer skin of the round rod tended to yield. For example, round rod with a 1-in diameter coiled in one of these 18-ft diameter reels 10 can be significantly stressed and permanently bent because surface bending stresses can be as high as 138-ksi. Operators found that the yielding of the round rod coiled in the 18-ft diameter reel did not apparently affect the operation of the rod once deployed and straightened for use with a downhole rotary pump. Yet, further reduction in the 18-ft diameter of the conventional reels has not been sought or promoted due to the problems with yielding stress. Accordingly, the current amount of yielding of the round rod has become an expected consequence of coiling the round rod on the 18-ft diameter reels 10, and the round cross-section rod has been used with the 18-ft diameter reels 10 for many years.

Despite its usefulness and industry acceptance, storing and transporting continuous rod on the existing 18-ft diameter reels 10 can be expensive and time-consuming. Depending on where the rod is to be used, the reel 10 with the coiled rod may be transported on any number of trucks and ships and may pass through several areas of the world with different shipping and transportation requirements. In most places and especially Canada, the current 18-ft diameter used for the reels 10 limits the transportation of the continuous rod to truck mounted transportation. As expected, the size and weight limitations for truck-mounted transportation can be significant.

As one example, FIG. 1B shows an end view of a truck trailer 30 carrying a conventional 18-ft diameter reel 10 on a support 40. The trailer 30 can have one or more such reels 10 disposed along its length and can be hauled by a truck, a dedicated vehicle, etc. The reels 10 carry the continuous rod, and the trailer 30 transports the reels 10 from a manufacturing facility to a well site for installation or to a ship for international or overseas shipment. The traveling space for the trailer 30 and reels 10 viewed from the end is limited to about 12-ft by 15-ft. In this way, the reels 10 with their 18-ft diameter are built as large as possible to just meet the dimensional limits defined by Canada's transport regulations so they can be transported with less restriction.

Unfortunately, rail transportation of the 18-ft diameter reels 10 is not possible due to their size. In addition, the reels 10 must be shipped as bulk freight for overseas shipments, requiring special handling procedures and equipment. As expected, any long distance transport of these reels 10 can be very expensive, and the difficulties and expense involved in transporting the rod has limited its application and use in the industry.

In addition, the conventional reel 10 shipped with the coiled rod is a substantial inventory item. Therefore, the empty reel 10 must be returned to a facility for reuse. As expected, returning the empty reel 10 from a distant location to the manufacturing facility can still cost a considerable amount.

All of the required costs and travel time involved in transporting rod on the conventional 18-ft diameter reel 10 have been recognized in the industry for some time, but have simply become accepted. In fact, one recently recognized solution in the industry to overcome the problems with transporting continuous rod has sought to avoid the transportation issue entirely. For example, U.S. Pat. No. 6,481, 082 proposes a technique for making continuous rod directly at the well site by welding individual, 40-ft lengths of straight round bar together on location to form the desired rod. In this way, the rod does not need to be manufactured at a facility and transported on a reel to the work site. Although this solution avoids the issue of transporting the continuous rod, it creates potentially new difficulties at the work site.

The subject matter of the present disclosure is directed to overcoming, or at least reducing the effects of, one or more of the problems set forth above.

SUMMARY

In one arrangement, a continuous rod transport system uses a pedestal having a base and a platform. This pedestal can be a transport stand for a bed of a trailer or can be a mount disposed on the frame of a dedicated trailer. The platform articulates relative to the base and supports a reel for continuous rod thereon.

When used on a dedicated trailer, the pedestal's platform rotatably supports the reel thereon and has a motor coupled to a wheel to which the reel is rotatably supported. During operation, the motor controls the rotation of the reel. A piston coupled between the base and the platform can pivot the platform relative to the base about a pivot to prepare the reel for winding or unwinding rod from the reel.

On the pedestal, arms extend outward and have ends enclosing around an edge of the reel. These ends can have wheels rotatably disposed thereon. The wheels have blades engaging portion of the reel and rotating with the reel by the engagement. These blades can close off a passage in the reel for the rod into or out of the reel.

As an alternative, gates disposed on the reel can selectively open and close over the passage in the reel for the continuous rod coiled therein. Interconnected bars rotate together. When one bar reaches a first point in the reel's rotation, it opens the connected bar to open up the passage. Then, when the bar reaches a second point in the reel's rotation, it closes the connected bar to close off the passage.

The reel for the continuous rod has a cage with a support disposed about a center of the cage. The support holds the continuous rod coiled about the center of the cage. In various arrangements, the cage can have a fixed hub or a removable hub for rotating the cage. The removable hub positions in the center of the cage and can removably attach to the cage. In general, the reel can have any suitable diameter and can have a reduced diameter at least less than 18-ft and approximately 14-ft or even less.

In another arrangement, a trailer transport stand transport a reel of continuous rod on a bed of the trailer. The stand has a base that disposes on the bed. A platform pivotably connects to the base and supports the reel for the continuous rod thereon. At least one support removably disposes between the platform and the base and holds the platform at an angle relative to the base when transporting the reel with the stand. To hold the reel on the platform, arms connected to the platform can pivot inward to the platform around an outer edge of the reel. Ends of these arms affix to one another with chains across the reel to support the reel on the platform. When not holding a reel, the stand can collapse to a flat condition for return transport. In this condition, the platform collapses against the base, and the arms pivot outward from the platform.

In another arrangement, a transport trailer for a reel of continuous rod has a body supported by wheels. A pedestal supported on the body rotatably supports the reel for the continuous rod thereon. A deployment unit disposed on the body can both bend and move the rod relative to the reel. For example, the deployment unit can have a rod transfer unit and a rod bender unit that communicate the rod between each other. The rod transfer unit moves the rod relative to the reel, and the rod bender unit bends the rod being moved. A guide tube can connect from adjacent the reel to the deployment unit and can guide the moving rod therebetween.

The deployment unit can have a frame for the bender and transfer units. This frame can removably mount on the body of the trailer so it can be set up for operation. Alternatively, the rod bender unit can pivot on an arm affixed to the body of the trailer to pivot relative to the reel. The rod transfer unit can slide on a platform affixed to the body of the trailer to slide relative to the bender unit. Alternatively, the transfer unit and the rod bender may be connected to each other such that they may be deployed together by a single action. Deployment of the transfer unit and the rod bender can be achieved manually or automatically (i.e., using a hydraulic actuator or the like).

To wind continuous rod on a transport reel, the continuous rod is conveyed along its axial length from a source and is permanently bent at an angle relative to its axial length. Once bent, the bent rod is coiled a number of times in the transport reel. Thus, manufactured rod is first curved before being loaded into the reel at least at the start of winding the rod in the reel. Eventually, the rod may not need to be bent before being coiled in the reel.

To unwind the continuous rod from the transport reel to a destination, such as a handling unit, the continuous rod is uncoiled from the transport reel and is permanently straightened relative to its axial length. The straightened rod is then conveyed to the handling unit, such as a gripper system at a wellsite.

The transport reels disclosed herein can be transported using commonly available transport units, such as flat deck trailers and flat deck railcars. All the same, the system can reduce transportation costs. In particular, the disclosed transport system has a number of independent modules (i.e., units, reels, stands, etc). These modules can be manufactured independently and at different locations along a transport chain. Thus, certain modules can built within one regulatory area where the complete unit is intend to be deployed, while other modules can be built in other locations. In this way, the modules can be built based on local variations to meet specific local requirements for transporting coiled rod in transport reels using road, trailer, railcar, ship, etc.

The foregoing summary is not intended to summarize each potential embodiment or every aspect of the present disclosure.

BRIEF DESCRIPTION OF THE DRAWINGS

FIG. 1A illustrates a transport reel according to the prior art.

FIG. 1B shows the prior art reel carried on a trailer.

FIGS. 14A-14C illustrate perspective, side, and end views of a flat rack container having multiple cages of the second transport reel disclosed herein.

FIGS. 18A-18C show perspective, front, and side views of the stand without the reel.

DETAILED DESCRIPTION

A. First Transport Reel

Figure 2A:
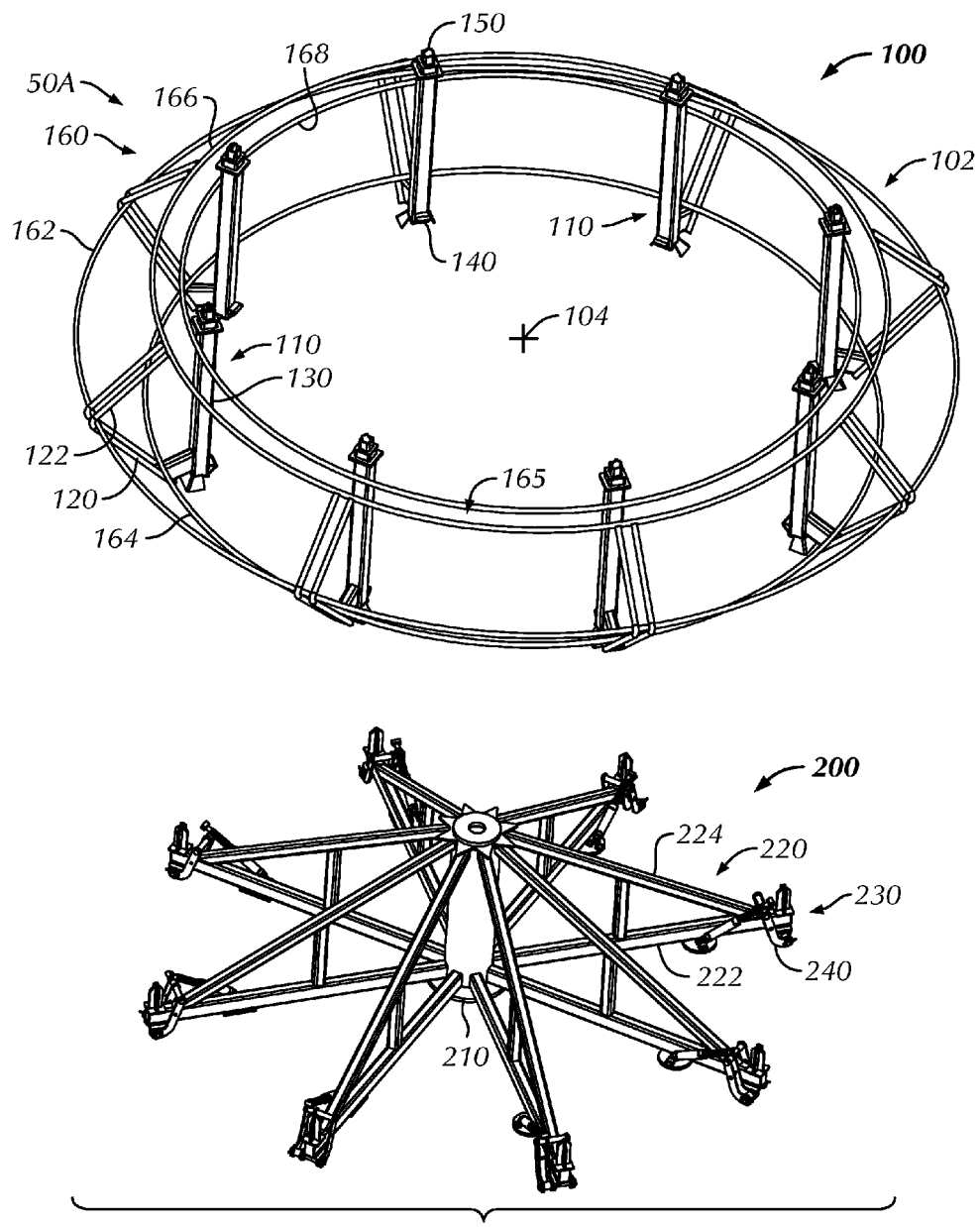
FIG. 2A illustrates a first transport reel according to the present disclosure having a cage and a removable hub separate therefrom.
Figure 2B:
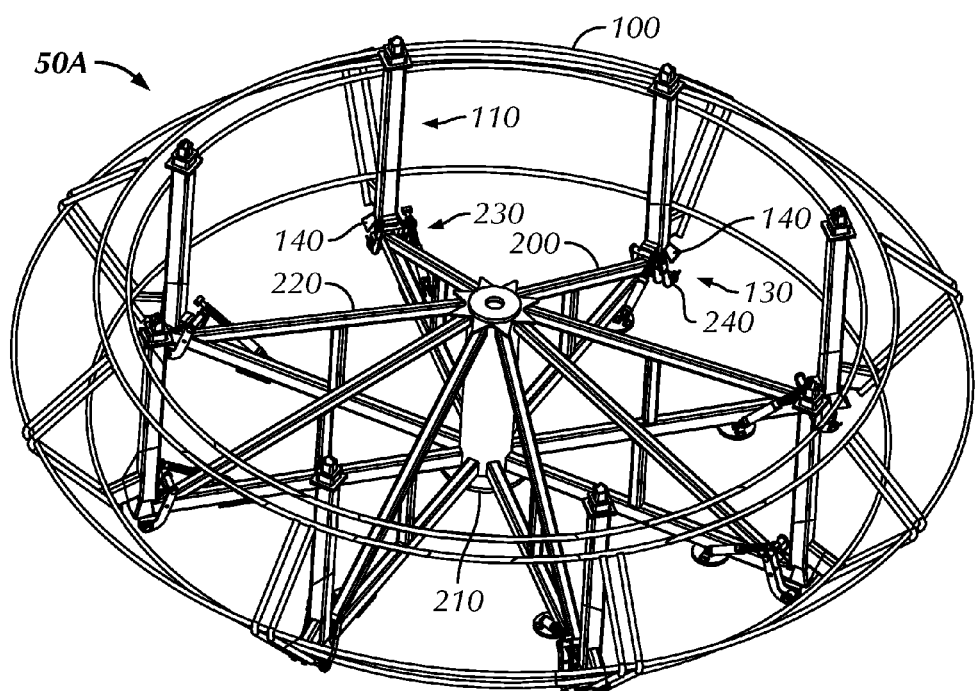
FIG. 2B illustrates the first transport reel with the cage and hub connected together.

Referring to FIGS. 2A-2B, a first transport reel 50A for continuous rod (not shown) has a cage 100 and a removable hub 200 that are separate components coupleable together to form the complete reel 50A. As best shown in FIG. 2A, the cage 100 has a support 102 disposed about a center 104 of the cage 100 for holding the continuous rod coiled in the cage 100. Preferably, several separate support members 110 are used for the support 102 to hold the coiled rod therein. As shown, the cage's support 102 has eight such support members 110, although more or less support members 110 could be used. These support members 110 are disposed about the cage's center 104 and are interconnected together by several rings 160 as discussed in more detail later. As an alternative, the support 102 can be a continuous wall disposed about the periphery of the cage 100 for holding the coiled rod therein.

The continuous rod is not shown for simplicity, although it is understood that the rod would be coiled around the cage 100 inside the support 102. As also shown in FIG. 2A, the hub 200 has arms 220 disposed about a central member 210. Each of the arms 220 has a distal end 230 with a lock 240. As best shown in FIG. 2B, the arm's distal ends 230—of which there are also eight—couple to the support members 110 of the cage to form the complete reel 50A.

1. Cage

Turning in more detail to the cage 100, the support members 110 are disposed about a center of the cage 100 for holding the coiled rod. Each support member 110 has an outer upright 120 toward the cage's outer perimeter and has an inner upright 130 toward the cage's inner perimeter. The outer upright 120 define an acute angle 122 and holds the spring bias of the rod when coiled in the cage 100. This angle 122 helps to layer the continuous rod at it is coiled inside the cage 100. Each of the inner uprights 130 has a foot 140 at one end (connected to the outer upright 120) and has a head 150 at a free end (separated from the outer upright 120).

Rings 160 disposed about the cage 100 attach to the uprights 120/130 and interconnect the support members 110 together. For example, one ring 162 attaches inside the outer upright's angles 122, and another ring 164 attaches inside the outer uprights 120 where they connect to the inner uprights 130. For additional support and to guide the rod, the cage 100 also has two rings 166/168 disposed about the free ends of the uprights 120/130. These two rings 166/168 define a circumferential slot 165 for passage of the continuous rod into and out of the cage 100 during use.

The support members 110 can be composed of square, round, flat, or other shaped bars or rods that can be integrally formed or can be welded, bolted, or otherwise affixed together. Separate support members 110 tied together by interconnecting rings 160 is preferred to reduce the weight and cost of the cage 100, which may be reusable or may be an expendable component. However, the support 102 can use walls or other flat surface disposed about the outer perimeter of the cage 100 to hold the continuous rod if desired.

2. Removable Hub

As noted previously, the hub 200 has arms 220 that extend from the hub's central member 210 and that removably couple to the cage 100. As best shown in FIG. 2B, the hub 200 positions in the center of the cage 100, and the locks 240 on the arms' distal ends 230 attach to the feet 140 on the cage's inner uprights 130. Further details of this coupling are provided later. The hub's central member 210 can fit onto an axle or axis of handling equipment, and the reel 50A having the cage 100 and hub 200 can be rotated thereabout when coiling and uncoiling the rod. Therefore, the hub 200 can be used for handling the cage 100 in a manufacturing facility and at a work site, but can be removed for transporting the cage 100 by itself.

Figure 3:
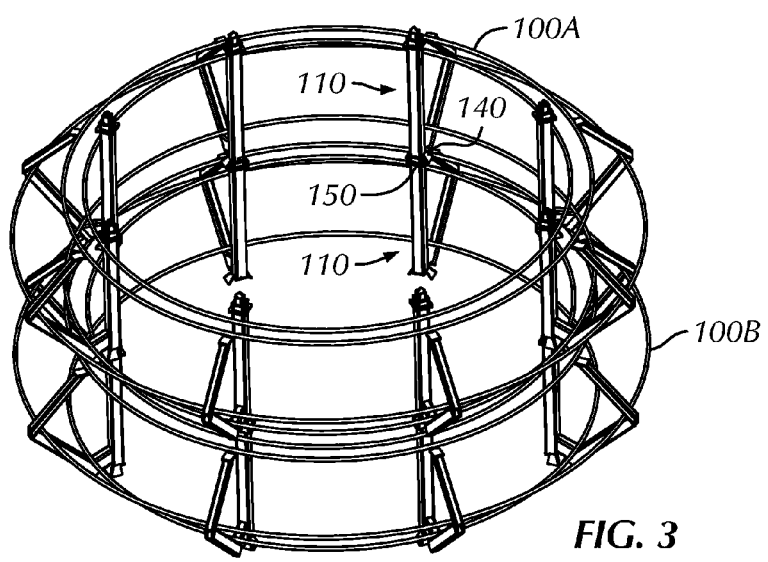
FIG. 3 illustrates two cages of the first transport reel stacked on top of one another.

The cage 100 can not only couple to the hub 200 as shown in FIG. 2B, but separate cages 100A-B as shown in FIG. 3 can stack on top of one another. As noted above, each of the inner uprights 130 has a head 150 at one end and has a foot 140 on the opposite end. To stack the cages 100A-B, the feet 140 on the upper cage 100A fit onto the heads 150 on the lower cage 100B. Depending on the circumstances, two or more cages 100 can be stacked together as shown. Stacking of the cages 100A-B in this way can facilitate the storage and handling of the cages 100A-B whether they have continuous rod coiled therein or not. This stacking also allows the cages 100 to be easily stored as inventory at a facility.

3. Removable Coupling Between Cage and Hub

Figure 4:
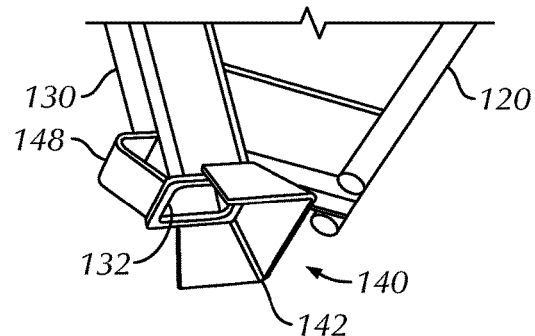
FIG. 4 shows a perspective view of a foot of one of the cage's support members for the first transport reel.
Figure 5:
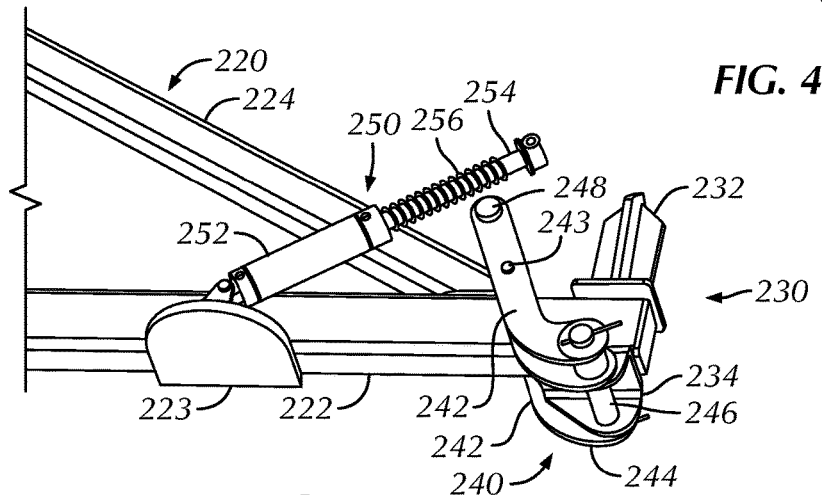
FIG. 5 shows a perspective view of a lock on one of the hub's arms for the first transport reel.
Figure 6:
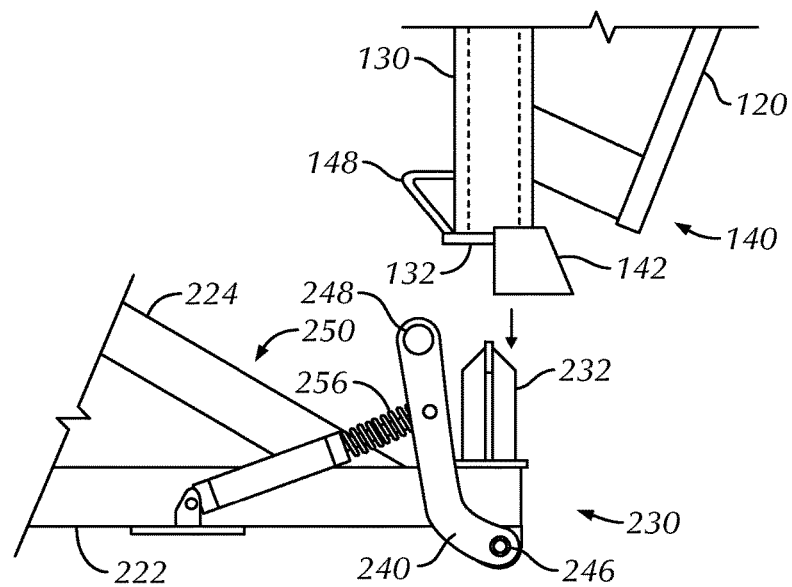
FIG. 6 shows a side view of the support member's foot interfacing with the arm's lock for the first transport reel.

FIGS. 4 through 6 provide further details directed to the coupling between the cage 100 and the removable hub 200. FIG. 4 shows a foot 140 on the cage's inner upright 130. The lower end of the upright 130 has a slot 132 surrounded by a skirt 142 on three outer sides. The inner side of the upright 130 facing toward the cage's center has a shoulder 148. The upper face of this shoulder 148 is perpendicular to the upright 130, while the lower face is slanted.

FIG. 5 shows a distal end 230 of the hub's arm 200. A lower bar 222 of the arm 220 connected to the hub's central member (210) extends to the arm's distal end 230, while an upper bar 224 of the arm 220 connects from the central member (210) to the lower bar 222 just short of the distal end 230. A nub 232 extends upward from the lower bar 222, and a pivot base 234 extends downward from the lower bar 222.

The lock 240 on the arm 220 has parallel levers 242 on one side of the bar 224 and has an opposing lever 244 on the other side. These levers 242/244 pivot on a pin 246 disposed in the bar's pivot base 234. An upper pin 248 connects the distal ends of the levers 242/244 together, and an intermediate pin 243 is disposed between the parallel levers 242.

An actuator 250 pivotably extends from a shelf 223 on the lower bar 222 to the lock 240. The actuator 250 includes a cylinder 252 with a piston rod 254 extending therefrom and biased by a spring 256. Although shown unattached in FIG. 5, the distal end of the piston rod 254 couples to the intermediate pin 243 on the levers 242 to pivot the lock 240 about the pivot pin 246. Preferably, the actuator 250 is a pneumatic piston operated by a separate air supply (not shown) that can be connected to the actuator 250 to activate it.

FIG. 6 shows how the cage's foot 140 couples to the hub's arm 220. The foot 140 on the cage's inner upright 130 aligns with the nub 232 on the arm's distal end 230. The cage (100) and hub (200) are brought together, and the nub 232 inserts into the upright's slot 132. The skirt 142 helps align the nub 232 with the upright 130 and also helps to hold the foot 140 on the distal end 230 of the arm 220.

Initially, the lock 240 with its levers is pivoted upward from the bias of the spring 256. However, the slanted face of the shoulder 148 pushes the lock 240 when it hits the locking pin 248 as the cage (100) and hub (200) are brought together. When the foot 140 seats on the nub 232, the lock 240 is biased back to its upright position so that the locking pin 248 engages the perpendicular face of the shoulder 148. This coupling is done for each of the hub's arms 220 to each of the cage's feet 140 to connect the hub (200) and cage (100).

At this point, the location of the pivot 246 offset from the alignment between the foot 140 and nub 232 tends to force the lever arms 242/244 further onto the shoulder 148 if the cage (100) and the hub (200) move to separate from one another. In particular, the lock 240 is held on the shoulder 148 by the spring 256. The location of the pivot 246 with regards to the shoulder 148 on the upright 130 helps to draw the locking pin 248 into the inner upright 130 if the cage 100 is drawn off the hub 200. This helps ensure the engagement of the locking pin 248 on the shoulder 148 without the need for the application of force by the spring 256.

To uncouple the lock 240 and free the cage (100) from the hub (200), the lock 240 is pulled back from the shoulder 148 to release the cage's foot 140 to the hub's arm 220. This can be done manually using a tool or the like. Alternatively, as shown in FIG. 6, the pneumatic piston 250 can be activated to pull back the lock 240 from the shoulder 148 to release the foot 140 from the arm 220. Either way, each of the hub's arms 220 is uncoupled from each of the cage's feet 140 to release the hub (200) and cage (100).

Figure 7A:
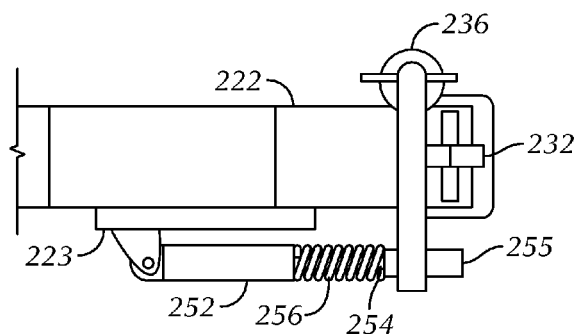
FIGS. 7A-7B show top and end views of another lock on one of the hub's arms for the first transport reel.
Figure 7B:
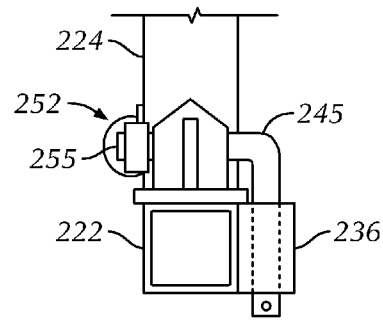

FIGS. 7A through 8B provide further details of another lock for coupling the cage 100 and the removable hub 200 together. As shown in FIGS. 7A-7B, the distal end 230 of the hub's arm 200 has the nub 232 extending from the lower bar 222 as before. A pivot base 236 attached to the side of the bar 222 has a lever arm 245 pivotably disposed therein. One end of this lever arm 245 connects by a coupling 255 to the actuator 250 having the cylinder 252, piston 254, and spring 256. Again, this actuator 250 is affixed to a shelf 223 attached on the bar 222.

Figure 8A:
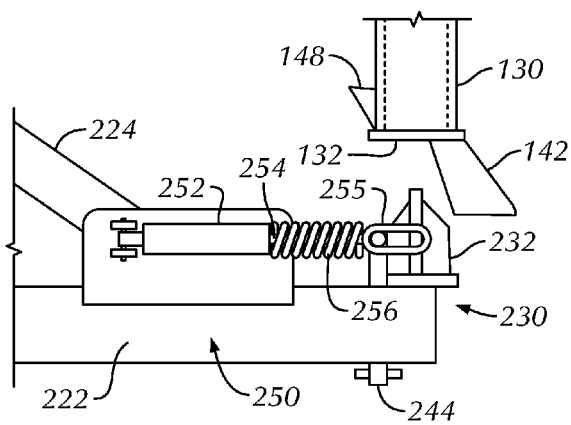
FIGS. 8A-8B shows side and perspective views of the other lock interfacing with one of the support member's feet for the first transport reel.
Figure 8B:
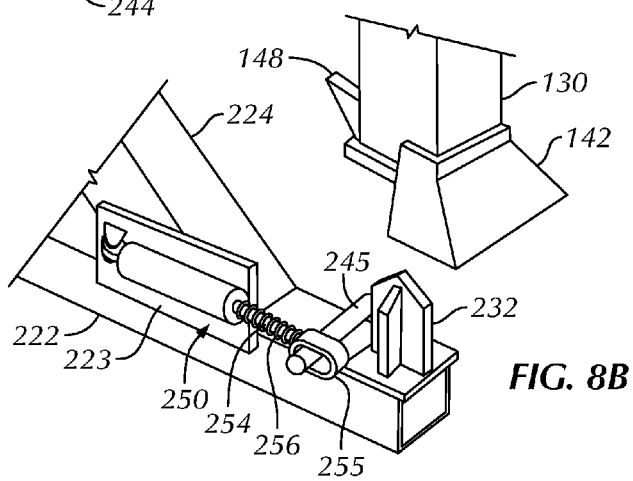

As shown in FIG. 8A-8B, the foot 140 on the cage's inner upright 130 has the slot 132 surrounded by the skirt 142 as before. In addition, the inner side of the upright 130 has a shoulder 148, although it may be less wide than before. To couple the cage's foot 140 to the hub's arm 220, the nub 232 inserts into the upright's slot 132 when brought together. The slanted face of the shoulder 148 pushes the lever arm 245 so that it turns in the pivot base 236. When the foot 140 seats on the nub 232, the lever arm 245 is biased back by the spring 256 to catch on the shoulder 148. The upper face of this shoulder 148 can be slanted inward to further catch with the lever arm 245 if desired.

Again, the lever arm 245 is held on the shoulder 148 by the spring 256, and the slant of the shoulder 148 can further pull the lever arm 245 toward the upright 130 if the cage (100) is drawn off the hub (200). To uncouple the lever arm 245 and free the cage (100) from the hub (200), the lever arm 245 is pulled back from the shoulder 148 manually using a tool or the like or using the actuator 250. As shown in FIGS. 8A-8B, for example, the pneumatic cylinder 252 can be activated to pull back the lever arm 245 from the shoulder 148 to release the foot 140 from the arm 220.

Although two locks have been disclosed for coupling the cage 100 to the removable hub 200, other forms of locks can be used. In general, the locks can use levers, latches, bolts, shoulders, ties, or other fasteners or mechanisms that removably interconnect portion of the cage 100 to portion of the hub 200.

B. Second Transport Reel

Figure 9A:
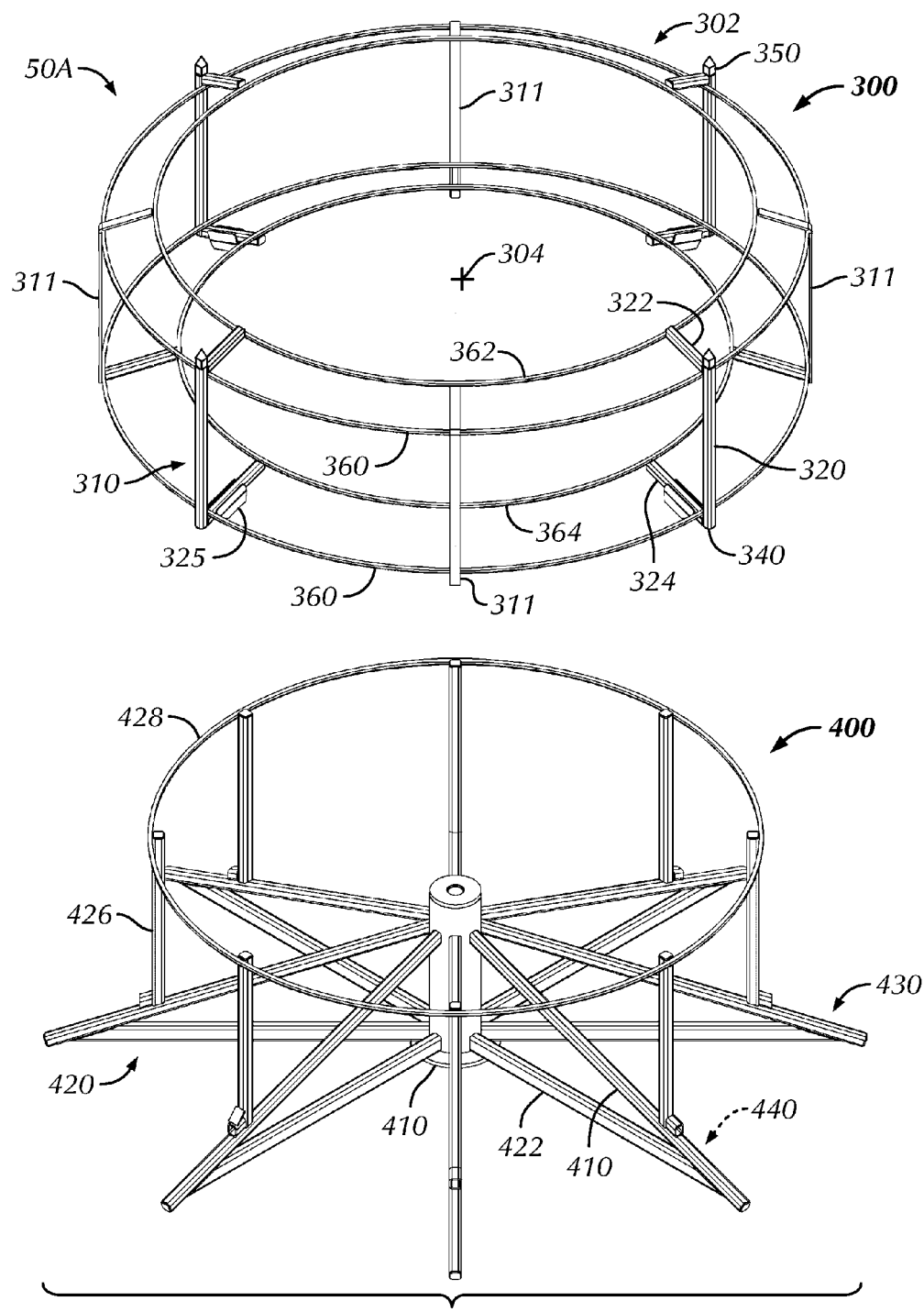
FIG. 9A illustrates a second transport reel according to the present disclosure having a cage and a removable hub separate therefrom.
Figure 9B:
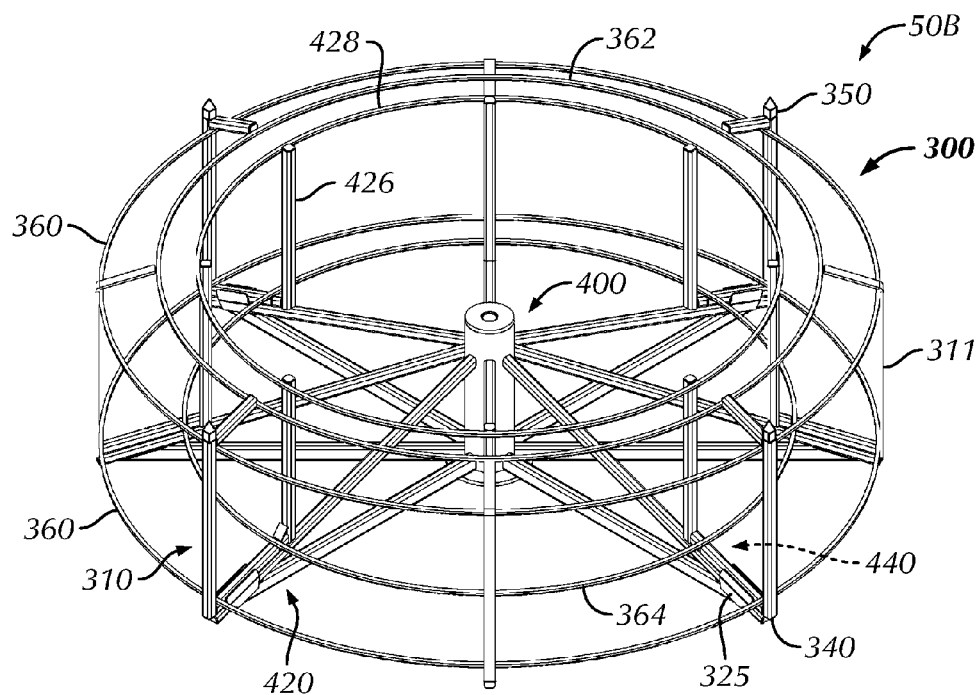
FIG. 9B illustrates the second transport reel with the cage and hub connected together.

Referring to FIGS. 9A-9B, a second transport reel 50B for continuous rod (not shown) has a cage 300 and a removable hub 400 that are separate components coupleable together to form the complete reel 50B. As best shown in FIG. 9A, the cage 300 has a support 302 disposed about a center 304 of the cage 300 for holding the continuous rod coiled in the cage 300. As shown, the support 302 has eight support members 310, although more or less could be used. Again, the cage's support 302 could be in the form of a continuous wall or the like disposed about the periphery of the cage for holding the coiled rod therein.

As also shown in FIG. 9A, the hub 400 has arms 420 disposed about a central member 410. Each of the arms 420 has a distal end 430. As best shown in FIG. 9B, the arm's distal ends 430—of which there are also eight—couple to the support members 310 of the cage 300 to form the complete reel 50B. Although not shown in FIG. 9A, one or more of the arm's distal ends 430 can have a lock (labeled 440), such as described in more detail later.

1. Cage

Turning in more detail to the cage 300, the support members 310 are disposed about the center 304 of the cage 300 for holding the coiled rod. Some of the support members (i.e., such as those labeled 311) are smaller than the main support members 310. Each support member 310 has an outer upright 320 toward the cage's outer perimeter to hold the spring bias of the rod when coiled in the cage 300.

Each outer upright 320 has upper and lower legs 322/324 extending from the ends of the uprights 320 toward the center of the cage 300. Preferably, these legs 322/324 are slightly angled from perpendicular to the upright 320, which facilitates stacking the cages 300 as described below. Rings 360 disposed about the cage 300 attach around the ends of the uprights 320 and interconnect the support members 310 together. In addition, upper and lower rings 362/364 attach around the upper and lower legs 322/324 to interconnect the support members 310 together.

The uprights 320 on the main support members 310 each have a foot 340 at one end and have a head 350 at the other end. In addition, the lower legs 324 on the main support members 310 each have a guide 325. The feet 340, heads 350, and guides 325 are discussed in more detail later.

As with the previous cage, this cage 300 defines a diameter less than 18-ft. Yet, this cage 300 preferably defines a diameter less than 14-ft and more preferably about 12-ft or 11.5-ft. Unlike the previous cage, the outer uprights 320 of this cage 300 do not define an angle so the outer periphery of the cage 300 is cylindrical. Lacking an angle to guide the rod naturally into layers into the cage 300, coiling rod into this cage 300 may require equipment to feed the rod into the cage 300 so that it layers neatly inside. To facilitate proper layering, this equipment may also load the rod into the cage 300 while the cage 30 is upright.

2. Removable Hub

As noted previously, the hub 400 has arms 420 that extend from the central member 410 and that removably couple to the cage 300. As best shown in FIG. 9B, the hub 400 positions in the center of the cage 300, and locks (labeled at 440) on the arms' distal ends 430 attach to the cage's support members 310. Further details of one type of lock 440 for this coupling are provided later.

As best shown in FIG. 9A, the hub's arms 420 have lower and upper bars 422/424 that extend from the central member 410 to the arm's distal ends 430. Inner uprights 426 extend from the upper bars 424 and have a ring 428 interconnecting the upright's ends together. As best shown in FIG. 9B when the hub 400 is disposed in the cage 300, the hub's ring 428 defines a circumferential slot with the cage's upper ring 362 so continuous rod can be passed into and out of the cage 300 during use.

The hub's central member 410 can fit onto an axle or axis of handling equipment, and the reel 50B having the cage 300 and hub 400 can be rotated thereabout when coiling and uncoiling the rod. Therefore, the hub 400 can be used for handling the cage 300 in a manufacturing facility and at a work site, but can be removed for transporting the cage 300 by itself.

Figure 10:
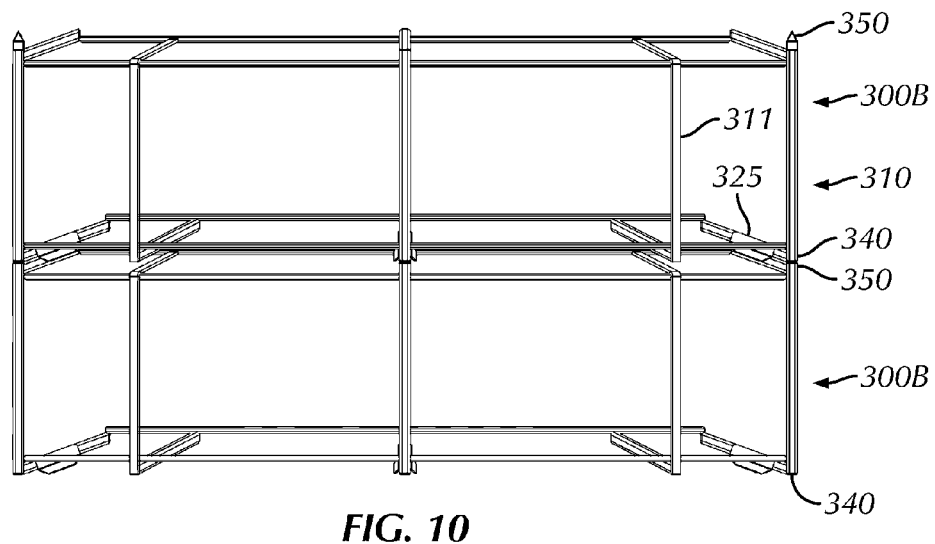
FIG. 10 illustrates two cages of the second transport reel stacked together.

The cage 300 can not only couple to the hub 400 as shown in FIG. 9B, but separate cages 300A-B as shown in FIG. 10 can stack together. As noted above, each of the support members 310 has an upper leg 322 and a lower leg 324. To stack the cages 300A-B, the guides 325 on the lower legs 324 of the upper cage 300A fit onto the upper legs 322 of the lower cage 300B. In addition, the heads 350, if present on the lower cage 300B, can insert in the feet 340 on the upper cage 300A as described later.

Depending on the circumstances, two or more cages 300 can be stacked together as shown. Stacking of the cages 300A-B in this way can facilitate storage and handling of the cages 300A-B whether they have continuous rod coiled therein or not. This stacking also allows the cages 300 to be easily stored as inventory at a facility.

3. Removable Coupling Between Cage and Hub

Figure 11A:
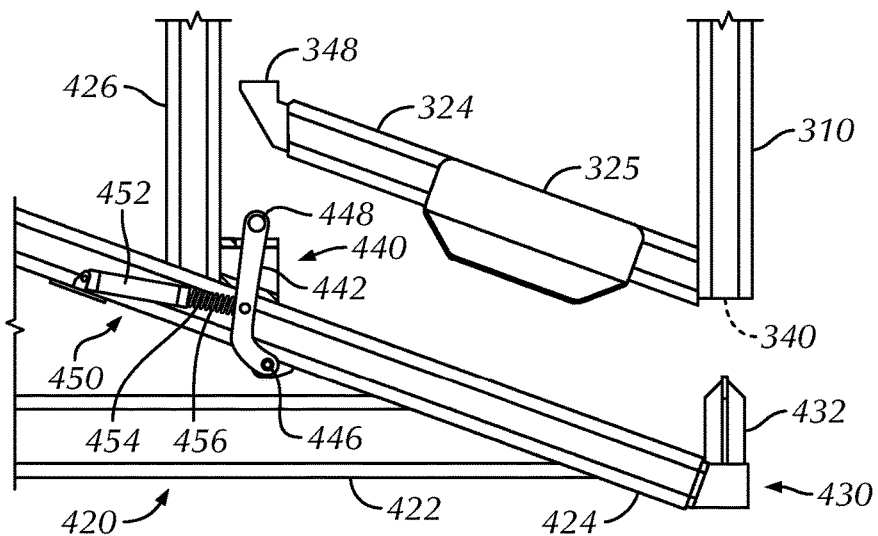
FIGS. 11A-11B show side views of the support member's foot interfacing with the arm's lock for the second transport reel.
Figure 11B:
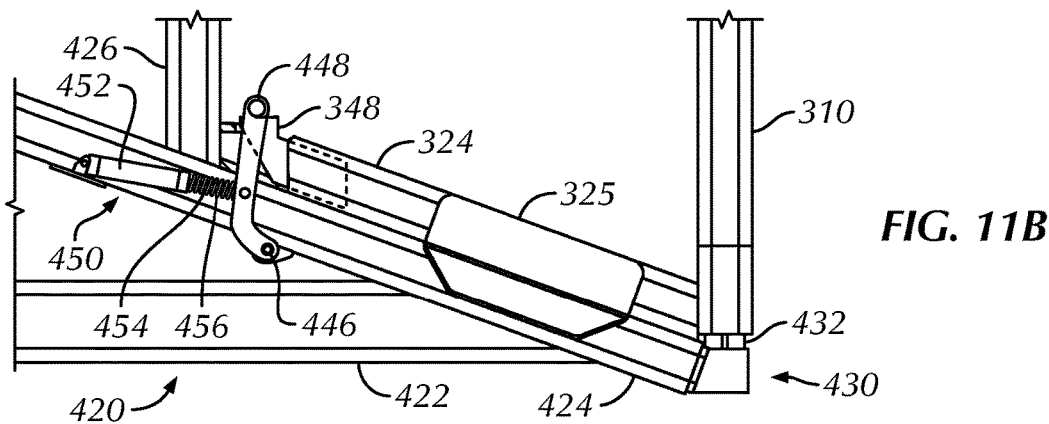

FIGS. 11A-11B show one type of lock 440 for coupling the cage (300) and hub (400) together. Like the previous arrangement, an upper bar 424 of the hub's arm 420 connected to the central member (410) extends to the arm's distal end 430, while a lower bar 422 of the arm 420 connects from the central member (410) to the upper bar 424 just short of the distal end 430. A nub 432 extends upward from the end of the upper bar 422. This nub 432 positions in the foot 340 of the cage's upright 310 when disposed thereon, as the guide 325 on the support's lower leg 324 positions against the upper bar 424. Yet, the angled lower leg 324 and the guides 325 on the cage (300) along with the angled bar 422 on the hub (400) help to locate and self-center the cage (300) and hub (400) together. Therefore, the arm 420 may not have (or require) the nub 432.

Similar to previous locks, this lock 440 has a lever 442 pivotably connected to the upper bar 424. The lever 442 moves a cross pin 448 relative to a shoulder 348 on the support's leg 324, and an actuator 450 pivotably extends from the upper bar 424 to the lever 442. As before, this actuator 450 can have a cylinder 452 with a piston rod 454 biased by a spring 456.

As the cage (300) and hub (400) are brought together, the nub 432, if present, can insert into the upright's foot 340. Initially, the lever 442 is pivoted outward by the bias of the spring 456. However, the slanted face of the shoulder 348 pushes the lever 442 when it hits the cross pin 448 as the cage (300) and hub (400) are brought together. Eventually, the lever 442 is biased back to its upright position so that the cross pin 448 engages the perpendicular face of the shoulder 348.

At this point, the offset location of the pivot 446 tends to force the lever 442 further onto the shoulder 348 if the cage (300) and the hub (400) move to separate from one another. To uncouple the lever 442 and free the cage (300) from the hub (400), the actuator 450 pulls back the lever 442 from the shoulder 348.

Figure 11C:
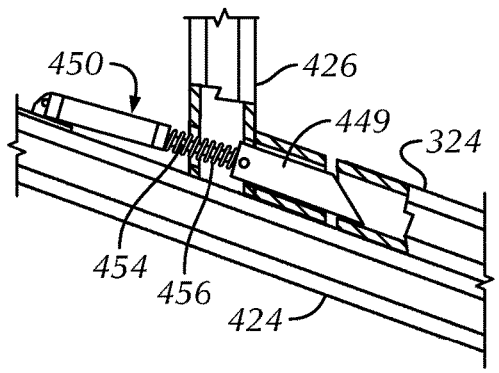
FIG. 11C shows a side view of another lock for the second transport reel.

Although this lock 440 uses a lever 442 and shoulder 348, other forms of locks could be used similar to discussed previously. As one additional example of a lock shown in FIG. 11C, a rod or pin 449 disposed on the upper arm 424 can be biased by spring 456 to insert into an open end of the lower leg 324 when the leg 324 is brought next to the arm 424. The biased pin 449 can then be pulled out of the end of the lower leg 324 by an actuator 450.

Figure 12:
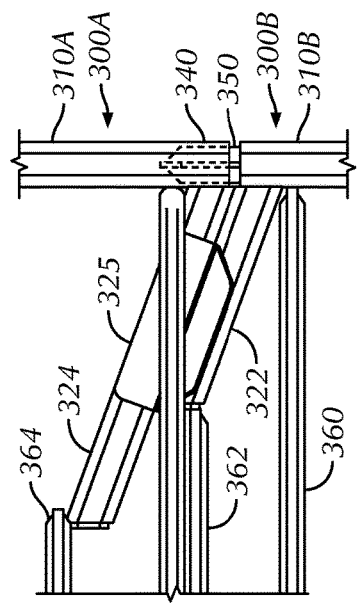
FIG. 12 shows how two cages of the second reel couple together.

Turning now to FIG. 12, seating one cage 300A on another 300B when stacking them together is shown in more detail. As shown, the guide 325 on the leg 324 of the upper cage's upright 310A fits onto the leg 322 of the lower cage's upright 310B. Although the upright 310A is shown having its foot 340 positioned on the head 350 of the other upright 310B, the heads 350 may not be needed. As noted previously, the angled lower leg 324 and guides 325 on the upper cage 300A along with the angled leg 322 on the lower cage 300B help to locate and self-center the cages 300A-B when stacked together. These and other forms of coupling could be used when stacking cages together.

C. Diameter of Cage

In addition to the benefits accrued from the modular nature of the disclosed reels 50A-B, the cages 100/300 have reduced size compared to conventional reels used in the art. As noted previously in the Background of the present disclosure, the conventional reel for storing and transporting coiled rod—even round rod—has an 18-ft diameter that has become the industry standard. As noted, the 18-ft diameter reel was initially suited for elliptical cross-section rod and Canada's transport regulations. Then, round rod developed later for rotary pump applications also used the existing 18-ft diameter reels, and the yielding produced in the round rod when coiled on these 18-ft reels simply became accepted. Therefore, the round rod has been used with the conventional 18-ft diameter reels for many years.

In contrast to this conventional size and despite the long-standing reluctance to coil rod about a smaller diameter, the cages 100/300 of the disclosed reels 50A-B have diameters less than 18-ft (216-in). For example, the cage 100 of FIGS. 2A-2B has a diameter of approximately 14-ft (168-in), and the cage 300 of FIGS. 9A-9B has a diameter of approximately 12-ft (144-in) or 11.5-ft (137-in). Research has shown that, although yielding occurs to the round rod when coiled on a reel having a diameter less than 18-ft, the affects of that yielding are not as problematic as previously expected in the industry.

As a preliminary matter, the plastic strain resulting from coiling round rod on a conventional 18-ft diameter reel is about 0.5%, which has not caused performance problems so that the use of the 18-ft diameter reel for round rod has become accepted practice. Coiling round rod on as small as a 12-ft diameter would increase the plastic strain to about 0.7%. Although the increase in the strain is small (i.e., 0.2%), the cold work from coiling the rod on a smaller spooling diameter would be expected to adversely affect various properties of the round rod, which would be detrimental to the rod's performance. These affected properties relate to mechanical property changes, localized corrosion resistance, environmental cracking resistance, and high cycle fatigue.

1. Testing of Rod Coiled about Cage's Diameter

Accordingly, several tests were conducted to determine what effect reducing the spooling diameter from 18-ft to as small as 12-ft would have on the properties of round rod. These tests measured tensile properties, localized corrosion resistance, environmental cracking resistance, and high cycle fatigue life for continuous rod samples composed of 4120M and having a 1.15-in diameter. In all measured properties, there were no significant differences between rod samples subjected to the two spooling diameters of 18-ft and 12-ft. Accordingly, the tests unexpectedly showed that decreasing the spooling diameter for the round rod to as small as 12-ft would not adversely affect the rod's properties and performance despite the conventional expectation in the industry that detrimental yielding would result.

a. Sulfide Stress Cracking

In a first test, sulfide stress cracking (SSC) screening tests were conducted at room temperature to assess changes in the rod's resistance to environmental cracking in $H_2S$ containing environments. Different samples of rod were tested, including (1) rod as-manufactured, (2) rod as-coiled and straightened from the standard 18-ft reel, and (3) rod coiled (bent) over a 72-in radius mandrel 10 times and straightened to simulate the coiling and uncoiling of the rod on a 12-ft (144-in) spooling diameter.

Four-point bent beam specimens were machined from each of the test samples, and the test specimens were strain gauged in different $H_2S$ environments. The purpose of the tests was to determine whether there would be a difference in performance between the coiling diameters in an environment that more closely approximated a typical oil environment. None of the test specimens failed during the tests in the different $H_2S$ environment. In fact, no environmental cracking was detected so the rod was found to exhibit good resistance to sulfide stress cracking regardless of bending diameter (as low as 12-ft).

b. High Cyclic Fatigue

The most common failure mode for continuous rod is high cycle fatigue. Accordingly, high cycle fatigue tests were performed to assess changes in the fatigue resistance with respect to the spooling diameter as low as 12-ft. The fatigue tests were conducted using the standard 0.1 "R" ratio and high cycle fatigue specimens that are appropriate to the rod's geometry. As is known, the "R" ratio is the ratio of the minimum load to the maximum load. The specimens were curved such that the gage section that was fatigue-tested was near the OD of the rod along the plane of highest bending (outer radius). The samples tested were from the standard 18-ft spooling diameter and the smaller 12-ft spooling diameter.

The tests were conducted in air at various stress levels to determine the stress life relationship. The results indicated that there were no major differences between the tested samples having the standard 18-ft spooling diameter and those having the 12-ft spooling diameter.

2. Localized Corrosion

One of the known problems with cold work is the effect on localized corrosion. Previous study on tubulars that were cold strained by deformation indicates that the corrosion rate of the tubular's material is directly affected by the strain to which it has been subjected. Therefore, electrochemical tests were conducted on rods from the two spooling diameters of 12-ft and 18-ft by running a Tafel curve, resistance polarization, and cyclic polarization tests on these samples. The Tafel curve runs resulted in anodic and cathodic Tafel slopes and an average corrosion rate. In the end, the electrochemical tests performed did not reveal any significant differences in corrosion rates between the 18-ft and 12-ft spooling diameters.

3. Test Conclusions

As indicated above, the tests investigated tensile properties, localized corrosion resistance, environmental cracking resistance, and high cycle fatigue life of the rod having 12-ft and 18-ft spooling diameters. In all measured properties, there were no significant differences between rod samples subjected to the two spooling diameters.

The resistance to sulfide stress cracking was very good in that stress levels up to the yield strength exhibited no cracks. The actual environmental or material limits were not detected because no cracking was observed in any of the tests conducted. The results of the tests indicate that there are no significant differences between the 12-ft and 18-ft spooling diameters for the continuous rod.

Accordingly, the spooling diameter of the disclosed cages 100/300 can be less than 18-ft without adversely affecting the properties and performance expected from the continuous rod. In fact, the spooling diameter of the disclosed cage 300 in FIGS. 9A-9B can be as small as 12-ft based on the testing. Accordingly, a 13-ft spooling diameter has been chosen for the disclosed cage 100 of FIGS. 2A-2B and a 12-ft (or 11.5-ft) spooling diameter has been chosen for the disclosed cage 300 of FIGS. 9A-9B. As detailed below, these diameters just meet the size and space limitations conducive to transporting the cage.

D. Transportation and Use of Coiled Rod with the Disclosed Reels

With an understanding of how the cages 100/300 and hubs 200/400 couple together and the preferred diameters of the cages 100/300, discussion now turns to how the disclosed reels 50A-B can be transported and used.

1. Modular Transport

The cages 100/300 can hold the spring bias of the continuous rod once coiled therein. Because the hub 200/400 is removable, operators can transport coiled rod in the cage 100/300 alone without the removable hub 200/400. This reduces the total weight of what must be shipped to transport the coiled rod and greatly reduces the transportation costs.

The modular nature of the reels 50A-B can also reduces transportation cost because some components used to transport the coiled rod may be specifically expendable while other may be reusable. For example, the cages 100/300 may be an expendable transport component or could be reusable depending on transportation costs and where the rod is being shipped. In other words, the cages 100/300 can be lost packaging for long distance transport, but the cages 100/300 can be reused if returned to the manufacturing facility when economically feasible. The removable hubs 200/400, however, can be shipped separately from worksite to worksite and do not need to be shipped and returned with the cages 100/300.

Being smaller in diameter, the cages 100/300 are also more amenable to forms of transportation not available for conventional 18-ft reels used in the industry. For example, the smaller diameter cages 100/300 can be transported by rail and can require less space on a truck trailer.

2. Super Rack Transport

In another benefit, the smaller diameter cages 100/300 can fit inside a shipping container typically used for rail and oversea transport. This container is commonly referred to as a super rack container. Similar to the conventional flat rack container, the super rack container is available from Super Rack Global Pte Ltd. and disclosed in U.S. Pat. No. 6,227,397, which is incorporated herein by reference.

The super rack container is open an all sides, although it may have fixed or collapsible end walls. Unlike the conventional flat rack, the super rack container has telescoping corner posts that can extend to different levels. One available super rack container is the 40' Highcube Super Rack available from Super Rack that has interior dimensions of 457.3-in (11.615-m) (L)×96-in (2.438-m) (W)×a height (H) ranging in 4 increments from 89-in (2.264-m) to 137-in (3.483-m). These types of super rack containers can be used by shipping services and carriers, such as the United Arab Shipping Company (UASC), Hanjin Shipping, Sarjak, HMM, STX Pan Ocean, etc.

Being able to fit inside such dimensions typically used for rail and oversea transport, the cages 100/300 can be transported by the intermodal transport system in an intermodal container by rail, ship, and truck. This form of transport does not require the cages 100/300 to be handled directly when changing from one mode of transport to another. Therefore, standard cranes and other handling equipment of the intermodal transport system can be used when transporting the cages 100/300 in the containers. Empty cages 100/300, if to be returned to a manufacturing facility, are preferably transported in the containers so they can be handled using the existing intermodal container system even when returned.

a. Intermodal Transport of First Reel

Figure 13A:
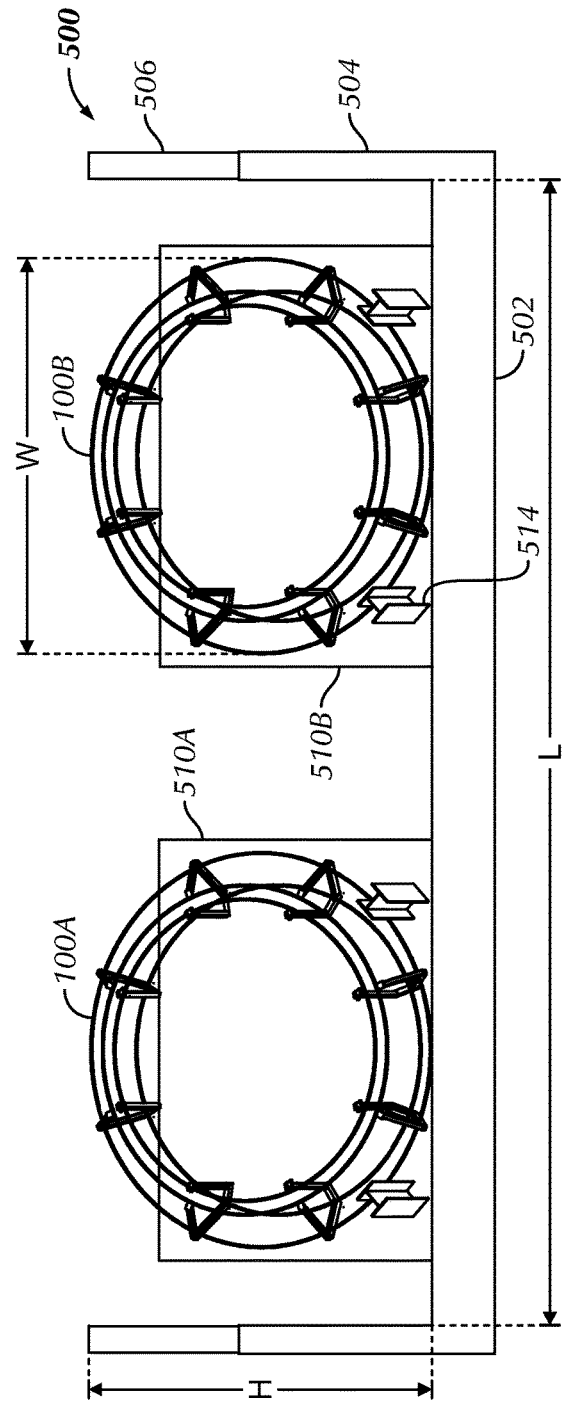
FIGS. 13A-13B illustrate side and end views of a flat rack container having two cages of the first transport reel disclosed herein.
Figure 13B:
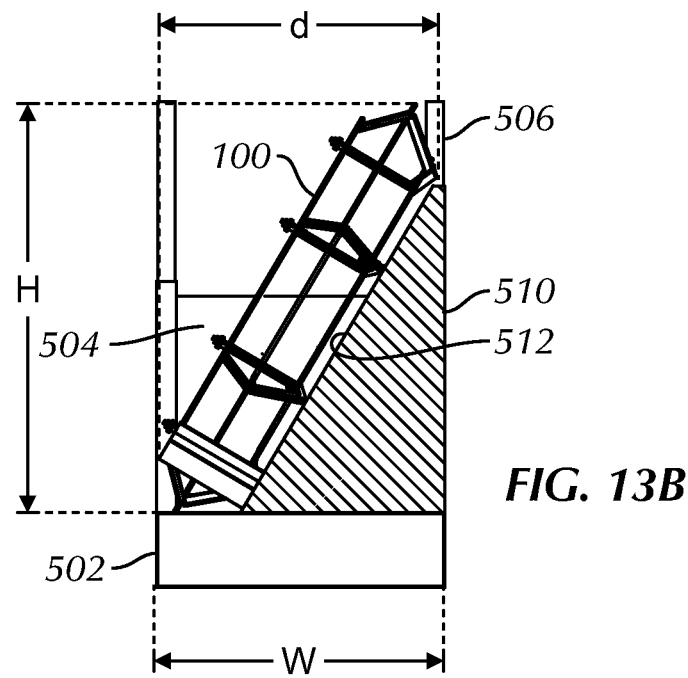

FIGS. 13A-13B show side and end views of a super rack container 500 having two cages 100A-B of the first transport reel 50A. As noted previously, these cages 100A-B define a diameter of about 14-ft. The super rack container 500 has a platform 502, end walls 504, and extendable corner posts 506. The sides of the container 500 can be open to facilitate loading. The container 500 can be carried on a rail car or on a ship and can have the standard outer dimensions of about 480-in (length)×96-in (width)×162-in (height) or similar thereto. The interior dimensions of the container 500 may be 458-in (L)×96-in (W)×137-in (H). When used, the platform 502 and posts 506 allow several such containers 500 to be stacked one on top of another when carried on a ship.

Stands 510A-B hold the cages 100A-B in the container 500. Each stand 510A-B sits on the platform 502 and has an angled wall 512 extending therefrom, which can be at an angle $\theta$ of about 60-degrees. The angled wall 512 supports the cage 100 thereon in a space defining a height (h) less than or equal to 137-in (i.e., about 136-in) and defining a depth (d) less than or equal to 96-in (i.e., about 93-in). In fact, the cage 100 may encompass a space having $92^{7}/_{16}$-in (d)× $135^{15}/_{16}$-in (h)×168-in (w). As shown, the cages 100A-B can be transported without the hubs 200 disposed thereon, and ledges or shelves 514 may support the lower end of the cages 100A-B. Of course, ties, bolts, or other form of fastening can be used to affix the cages 100A-B to the walls 512 and/or platform 502 depending on the transportation needs.

Using the super rack containers 500, stands 510, and 14-ft diameter cages 100 without hubs 200 eliminates the need for specialized trailers and dedicated oversize permits along the shipping routes. Overall, this form of transport will reduce shipping costs significantly, as detailed below. Although shown without the hubs 200, transporting the cages 100 with the hubs 200 with the super rack containers 500 could also maintain reduced shipping costs. As such, the benefits of the smaller diameter cage 100 could be maintained even though the hub 200 is not removed or is not even removable.

b. Intermodal Transport of Second Reel

Figure 14A:
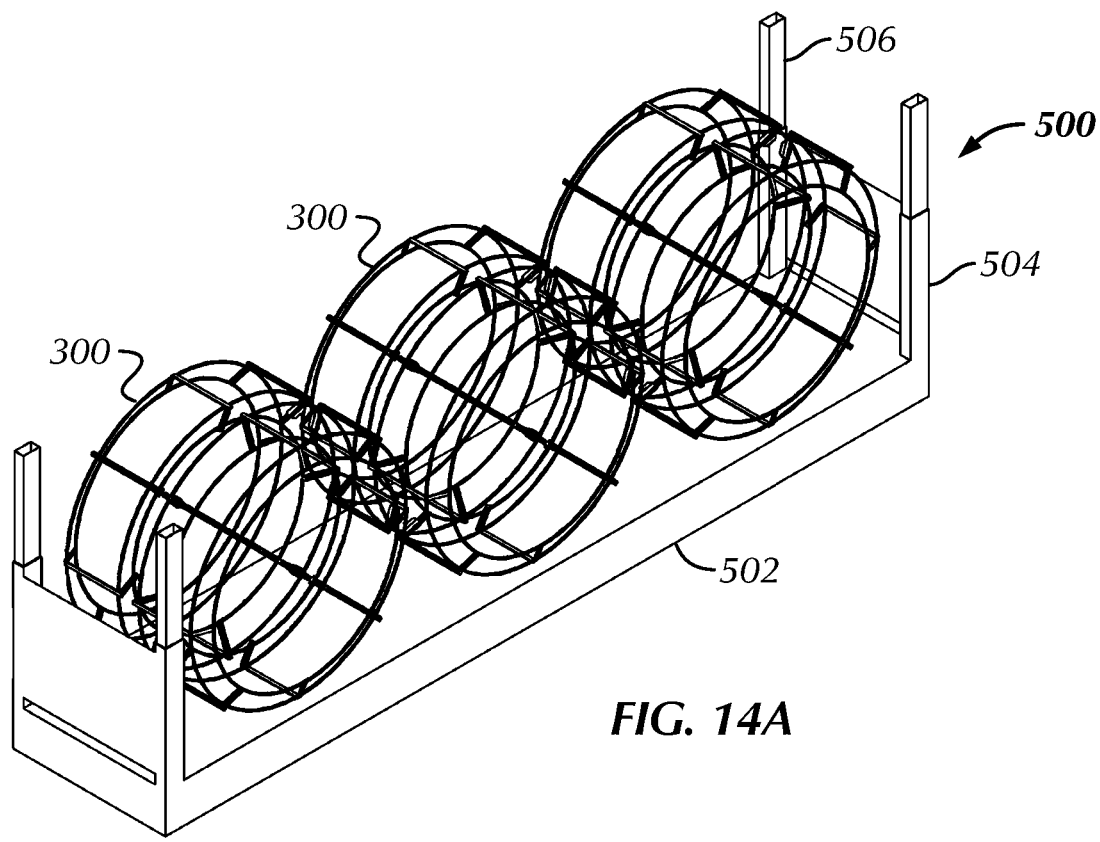

FIGS. 14A-14C illustrate perspective, side, and end views of a super rack container 500 having multiple cages 300 of the second transport reel disclosed herein. As noted previously, these cages 300 define a diameter (d) of about 11-ft 5-in (137-in), although the cage 300 may measure a diameter of about 140-in from one outer upright to the other. With the diameter of 137-in, six such cages 300 stand upright in the dimensions of the super rack container 500. In particular, the cages 300 stand in pairs side-by-side along the length of the container 500. The two cages 300 side-by-side define a width of about $90^{3}/_{16}$-in, which is less than the internal width (W) of 96-in for the container 500. In addition, the height of the standing cage 300 is about 137-in, which is at the internal height (H) of 137-in for the container 500.

These cages 300 can be supported by triangular supports between the pairs and by chains and other conventional means for supporting cargo. Although shown without the hubs 400, transporting the cages 300 with the hubs 400 with the super rack containers 500 could also maintain reduced shipping costs. As such, the benefits of the smaller diameter cage 300 could be maintained even though the hub 400 is not removed or is not even removable.

3. Transportation Cost Reduction

The cost of transporting the continuous rod is expected to be significantly reduced below the current industry standard, and in some instances, the cost may be reduced by as much as fifty percent. The conventional shipping method uses the conventional 18-ft diameter reels that must be transported by truck on land. For overseas shipments, the conventional reels are break bulk and are stored below deck.

Using the disclosed reel 50A with 14-ft diameter cage 100 and removable hub 200, for example, a new shipping method can use super rack containers (500) that can be transported by rail and stored above deck on a ship.

As shown in Table 3 below, example cost for shipping two reels by the conventional method from Canada to Houston and then Houston to the Middle East may be about $12,500.00 per reel.

TABLE 1

Example Transportation Costs by Conventional Method

| Description | Total Cost | Reels | Cost/Reel |
|---|---|---|---|
| Canada to Houston | $10,000.00 | 2 | $5,000.00 |
| Houston to Middle East | $15,000.00 | 2 | $7,500.00 |
| Summary | $25,000.00 | 2 | $12,500.00 |

As shown in Table 4 below, example cost for shipping continuous rod by the new method from Canada to the Middle East may be about $6,250.00 per cage. This new method uses the cages (100) having the 14-ft diameter shipped with coiled rod without the removable hub (200). These cages (100) can be positioned on stands (510) and fit onto super rack containers (500), which can be carried like standard freight on rail lines, vessels, and the like. Using this new method, the shipping cost per cage is about 50% less expensive compared to the conventional method currently in use.

TABLE 2

Example Transportation Costs by New Method

| Description | Total Cost | Cage | Cost/Cage |
|---|---|---|---|
| Canada to Middle East | $12,500.00 | 2 | $6,250.00 |

Each cage (100), however, for the new transportation method has about 20% less coiled rod compared to the conventional 18-ft diameter reels. Therefore, more cages (100) need to be shipped in order to transport the same amount of coiled rod. As shown in the cost analysis of Table 5 below, transporting forty conventional reels of coiled rod at $12,500 per reel may cost a total of $500,000 using the conventional method. Using the new method, forty-eight cages (100) must be used to transport the same length of rod.

As can be seen by the difference in cost, however, even though more cages must be shipped, the new method still results in a total cost that is about 40% less than the conventional method.

TABLE 3

Cost Analysis

| Description | Cost/Reel | No. of Reels | Total Cost |
|---|---|---|---|
| Conventional Method | $12,500.00 | 40 | $500,000.00 |
| New Method | $6,250.00 | 48 | $300,000.00 |
|  |  | Savings | $200,000.00 |

Based on the cost analysis, reduced transport weight, reduced transport size, and other benefits outlined above, the disclosed reel 50 having the 14-ft diameter cage 100 and removable hub 200 represents a significant improvement over current industry practices for transporting continuous rod. Moreover, due to the long-standing use of the conventional 18-ft diameter reels and the reluctance to use any other transport method, the disclosed reel 50 having the 14-ft diameter cage 100 and removable hub 200 satisfies a long felt need in the industry to deal with the existing limits of transporting continuous rod. The use of the smaller diameter cages 300 of FIGS. 9A-9B in the super rack containers 500 is expected to reduce transportation costs as well.

E. Winding Procedure for Rod in Reduced Diameter Reels

Figure 15A:
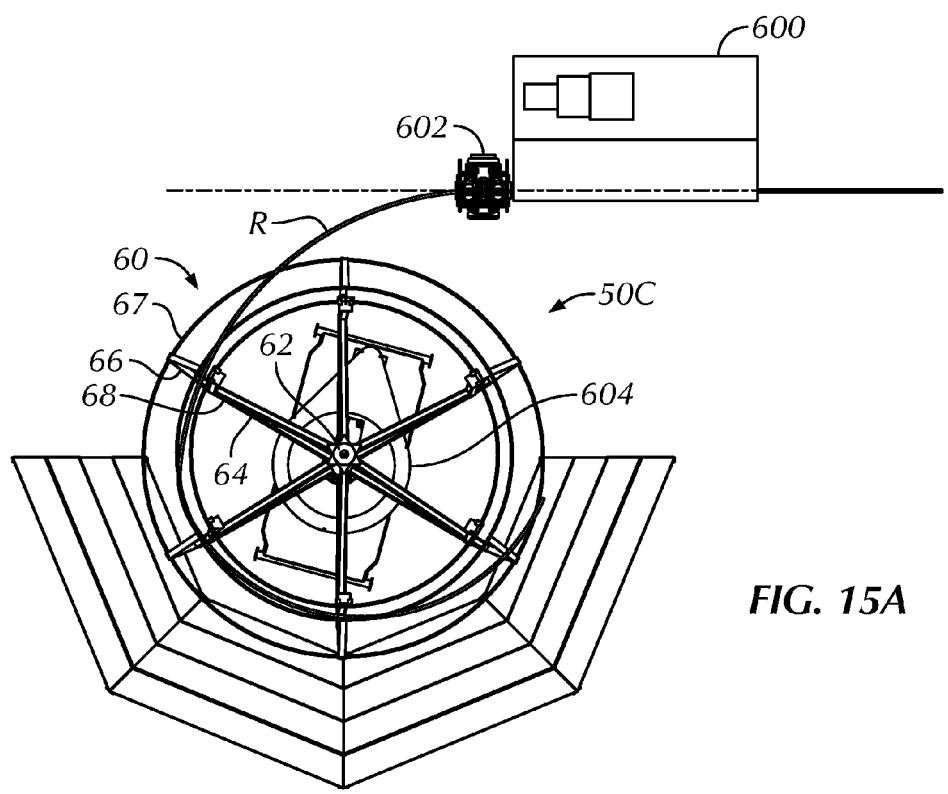
FIGS. 15A-15B show an assembly for winding a transport reel with rod.
Figure 15B:
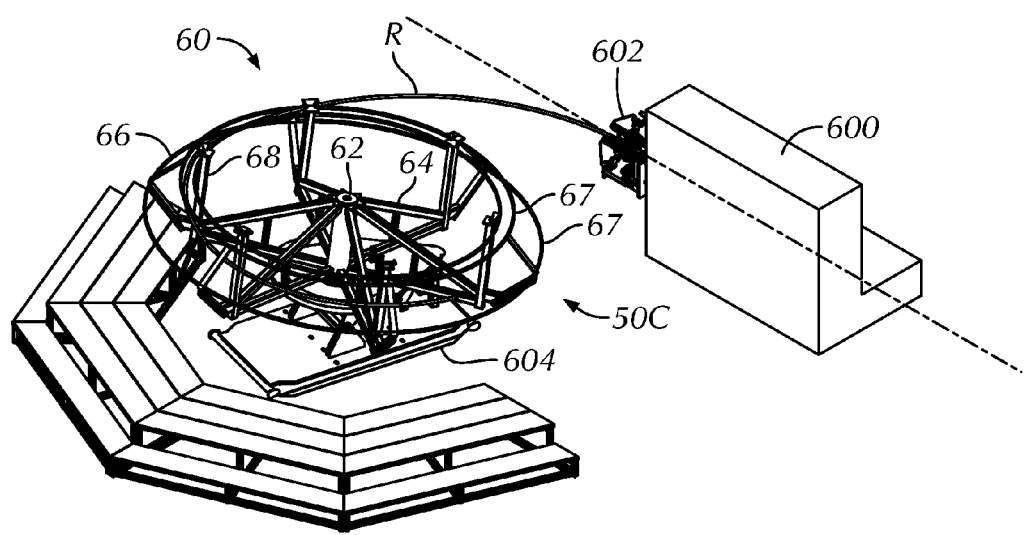

FIGS. 15A-15B show an assembly for winding a transport reel 50C with rod R. In this example, the transport reel 50C has a fixed cage and frame arrangement as opposed to the modular arrangement disclosed previously. However, the procedures for winding the modular reels discussed previously (e.g., in Figs. can be the same. As with the other reels disclosed herein, the transport reel 50C can have a diameter less than the typical diameter of 18-ft. For instance, the reel 50C can have a diameter of about 14-ft (196-in), 13-ft (156-in), or even less. In general, the height of the reel 50C can be about 42-in.

Briefly, the reel 50C has a hub 62 with arms 64 extending outward therefrom to support a cage 60. In this case, the cage 60 has bars 66/68 that connect to each of the arms 64 and that extend upwards therefrom. Wire rings 67 of the cage 60 interconnect the bars 66/68 together. Top rings 67 define a circumferential slot 65 around the top of the cage 60. A length of continuous rod R can be coiled in (and uncoiled from) the cage 60 through this slot 65 as the reel 50C is rotated about the hub 62. As shown, the hub 62 and arms 64 can be fixedly connected to the bars 66/68 of the cage 60, although an alternative embodiment may use a separate cage and removable hub according to the previous teachings.

Winding the transport reel 50C uses a transfer unit 600, a rod bender 602, and an operation platform 604. To load the rod R on the reel 50C, transfer unit 600 feeds the manufactured rod R, and the rod bender 602 initially curves or bends the rod R prior to entering the reel 50C. The transfer unit 600 combined with the rod bender 602 are installed in the immediate proximity of the reel 50C so the curved rod R can enter into the transport reel 50C primarily along the rod's natural curved path in the shortest possible distance. As noted previously, loading the rod R on the smaller reel 50C requires operators to pay attention to any increased buckling tendency of the curved rod R under load.

The transfer unit 600 and bending unit 602 are located in close proximity to the transport reel 50C being loaded because the rod R gets pushed through the bending unit 602 and fed into the reel 50C. The bending unit 602 bends the rod R directly from the transfer unit 600 to reduce the risk of rod buckling in the process. For its part, the transport reel 50C rotates on a slanted pedestal 604 to ensure the rod R is being forced towards the bottom of the transport reel 50C as it enters the reel's cage 60.

The rod bender 602 curves (permanently deforms) the rod R prior to the rod R entering into the reel 50C. In general, curving the rod R prior to entering the reel 50C can reduce the rod's stored energy, which helps the reel 50C contain the rod R. Curvature applied to the rod R at a small radius provides improved handling conditions, while curvature at a large radius provides improved stacking conditions. Thus, any curvature applied to the rod R is a compromise between good stacking behavior of the rod R in the reel 50C and improved handling conditions of the rod R in the reel 50C. Good stacking behavior of the rod R focuses on creating a dense rod bundle, using available space in the reel 50C effectively, loading the rod R in the reel 50C at a desirable speed and bending radius. Improved handling conditions of the rod R focus on creating less stored energy in the curved rod R, easing how the rod R is secured in the reel 50C, by using a small bending radius.

As one example of the compromise between handling and stacking conditions, rod R of over 1-in. in diameter fed into the reel 50C of small diameter (i.e., <18 ft or as small as 14-ft or less) can be bent by the bending unit 602 for the first several (e.g., seven or so) windings of the rod R prior to entering the reel 50C. Once these first several windings have been made, the rod R can be fed into the reel 50C essentially without bending by the unit 602. This procedure tends to wind the rod R in the reel 50C as desired.

F. Dedicated Transport Stands

When the reels 50A-50C of the present disclosure are wound with rod, they can be transported in a number of ways to a well site. Often, many forms of transportation must be used to move the loaded reels 50A-50C from a production site to their ultimate destination. For example, FIGS. 13A-13B and 14A-14B disclose arrangements for transport that use stands or pedestals for containers or the like.

Figure 16A:
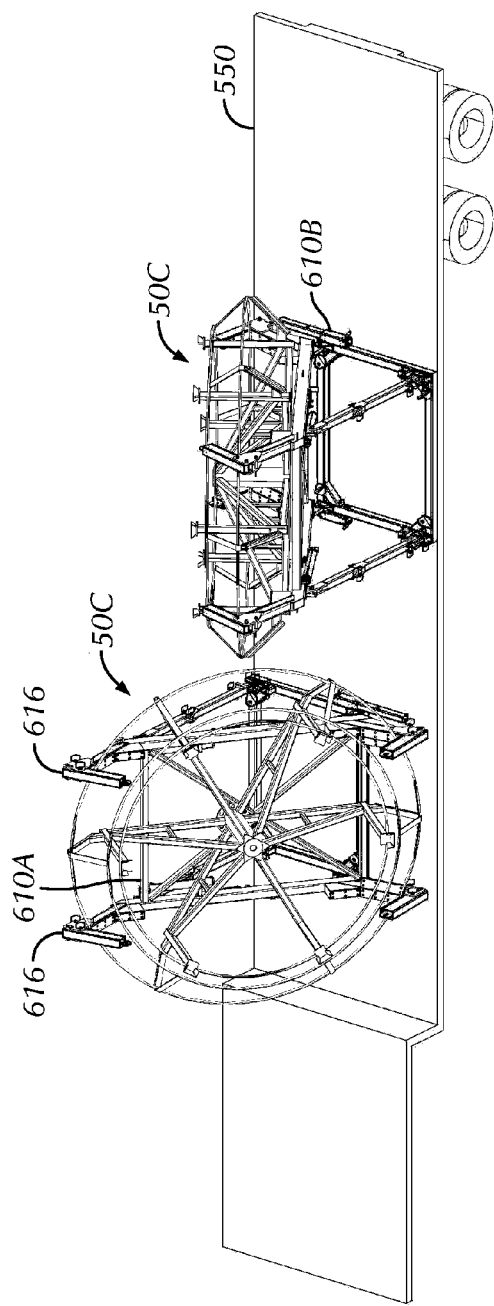
FIGS. 16A-16B show a system for transporting the reels and stands on a trailer.
Figure 16B:
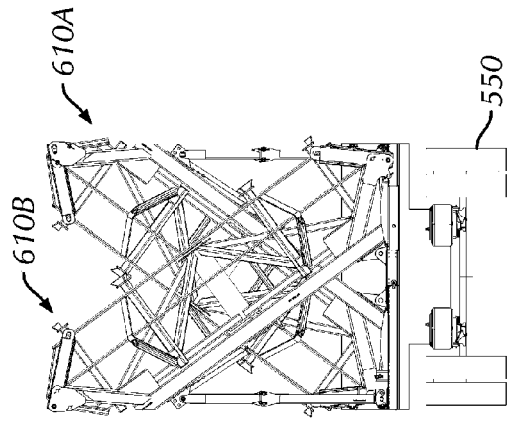

Along these lines, an arrangement for transporting reels illustrated in FIGS. 16A-16B uses a step deck trailer 550 and dedicated support stands or pedestals 610. The reels 50C again in this example are the fixed cage and frame arrangement as opposed to the modular arrangement disclosed previously. However, the procedures for transporting the modular reels 50A-50B discussed previously can be the same.

Figure 17C:
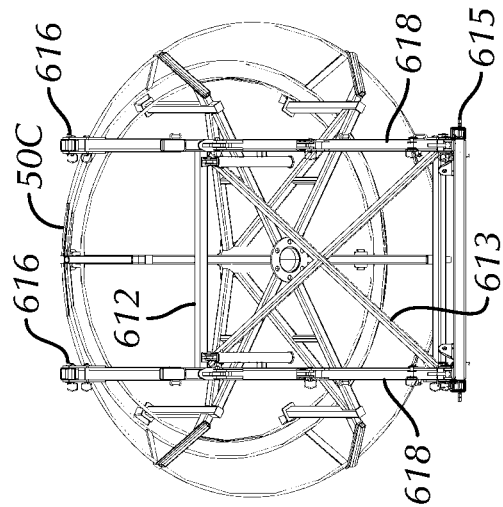
FIGS. 17A-17C show side, front, and back views of the reel mounted on the stand.
Figure 17B:
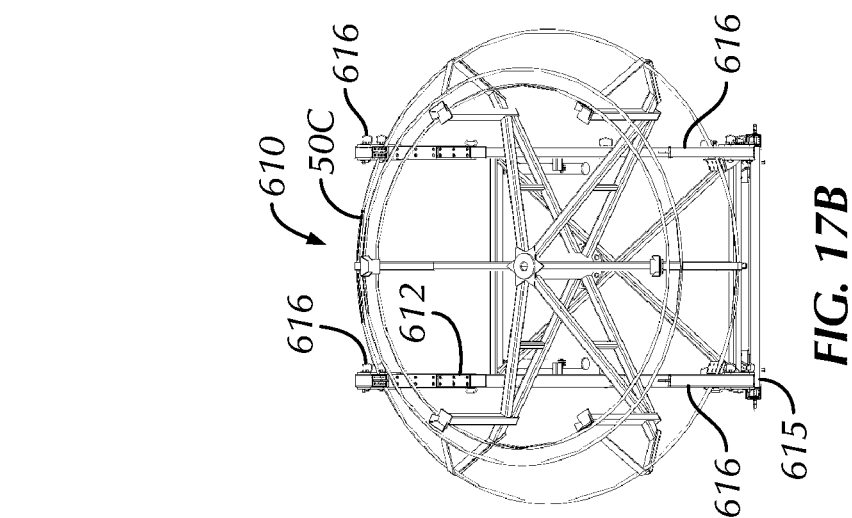
Figure 17A:
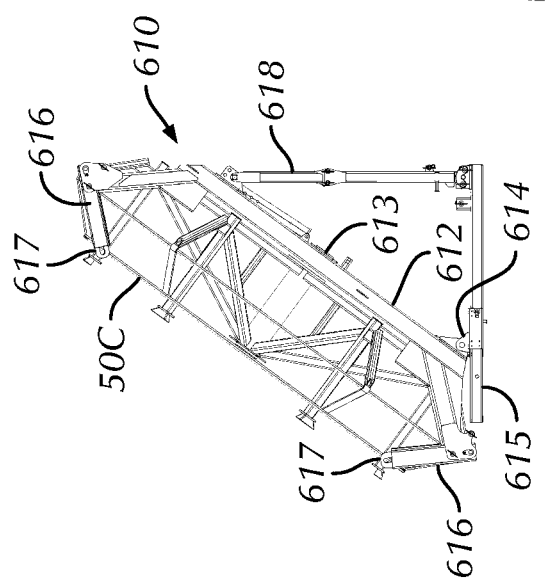

The reel 50C mounts in the dedicated transport stand 610. In turn, one or more of these stands 610 mount on the deck of the trailer 550 that has an appropriate deck height. Although shown on the trailer 550, the stands 610 can be used on rail cars, ships, and other means of transport for long distance, for example, from a plant to a harbor or from a harbor to a distribution center. FIGS. 17A-17C show side, front, and back views of the reel 50C mounted on a stand 610, while FIGS. 18A-18C show perspective, front, and side views of the stand 610 without a reel.

As shown, the transport reels 50C mount in the transport stands 610 fastened to a deck of the trailer 550 or the like. This allows a conventional step deck trailer 550 to be used in North America to transport the reels 50C while still meeting the regular transport envelope dictated by law. In addition, the transport stands 610 allow operators to send a number of reels 50C on a one-way trip to a given destination.

The transport stands 610 have containment frame or platform 612 connected to a base frame 615 by pivots 614. The base frame 615 mounts to the deck of the trailer 550 using known techniques, and the containment frame 612 can pivot relative to the base frame 615 to facilitate loading of the reels 50C onto the stands 610. The containment frame 612 can have a central mount for the hub of the reel 50C. At four corners, the containment frame 612 has jointed arms 616 that can collapse inward around the edge of the reel 50C.

To install a reel 50C on the stand 610, the containment frame 612 lays down closer to the base frame 615 mounted on the deck using short back legs (not shown). With the jointed arms 616 opened outward, operators use a crane to place the reel 50C in position on the containment frame 612. Then, operators close the jointed arms 616 in around the edges of the reel 50C and can install locking pins (not shown) in the elbows of the jointed arms 616. Operators then connect chains (not shown) diagonally across the reel 50C by affixing the chains to opposing ends 617 of the jointed arms 616.

Using the crane, operators then pivot the containment frame 612 with the lashed reel 50C at the pivot 614 and position the extended legs 618 between the frames 612/615 to hold the reel 50C in its angled condition shown in FIG. 16B.

Once raised, the reel 50C and stand 610 encompass an envelope that is approximately 2.5-m. wide and 4-m. high for the reel 50C that is 14-ft in diameter. This corresponds to a standard transport envelope when a step deck trailer of proper deck height is used in North America. As expected, being able to use standard transport enables operators to reduce overall transport costs.

Figure 19:
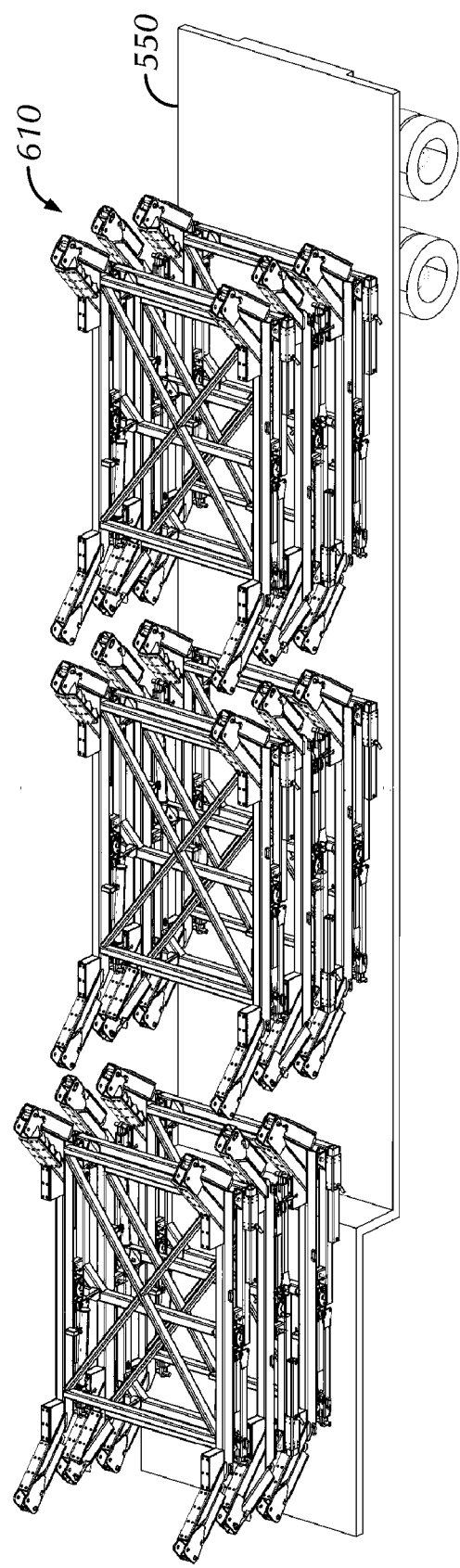
FIG. 19 shows a system for returning stands on a trailer.

When a number of stands 610 have been collected at a site, operators can make a return shipment of the transport stands 610 without any reels 50C. As shown in FIG. 19, stands 610 can be folded up and stacked on the trailer 550 so the stands 610 can be returned to a distribution center.

In particular, a number of reels 50 can be transported on a one-way trip to a destination. The reels 50 can be removed from the stands 610 and transported further or used in the field. Since the transport reels 50 can be transported as break bulk cargo on a ship, for example, there is no need for any transport stands 610 to be used. Therefore, the empty stands 610 can be stored temporarily while the reels 50 are handled separately. Eventually, operators can fold up the stands 610 and stack a number of them on one trailer 550 for a return trip to a distribution center. This arrangement allows operators to reduce transport cost.

G. Transport Trailer

Figure 20A:
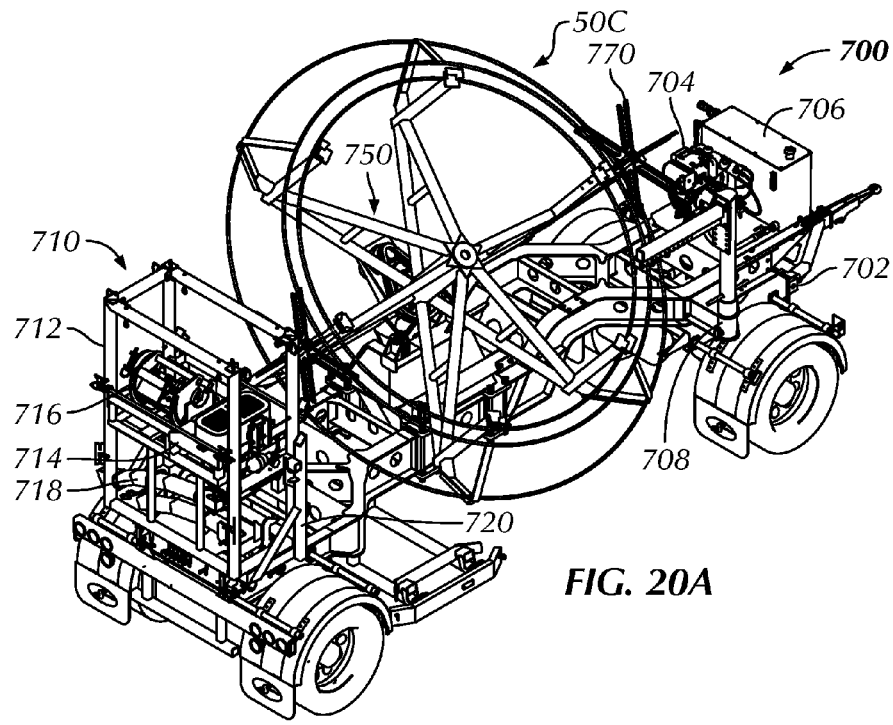
FIG. 20A-20B show perspective views of alternate sides of a transport trailer for the transport reel during transport to and from a worksite.
Figure 20B:
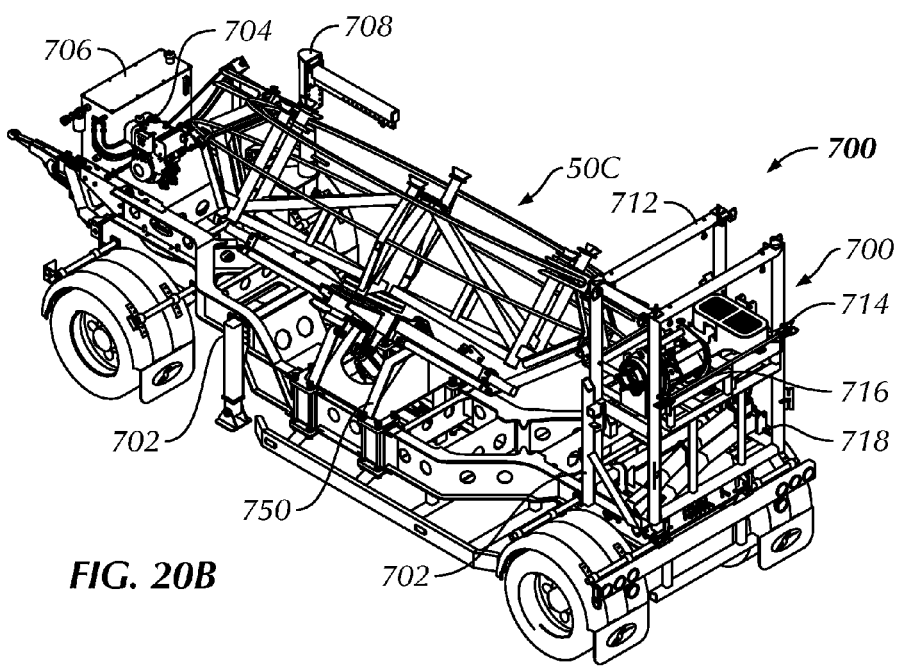
Figure 21A:
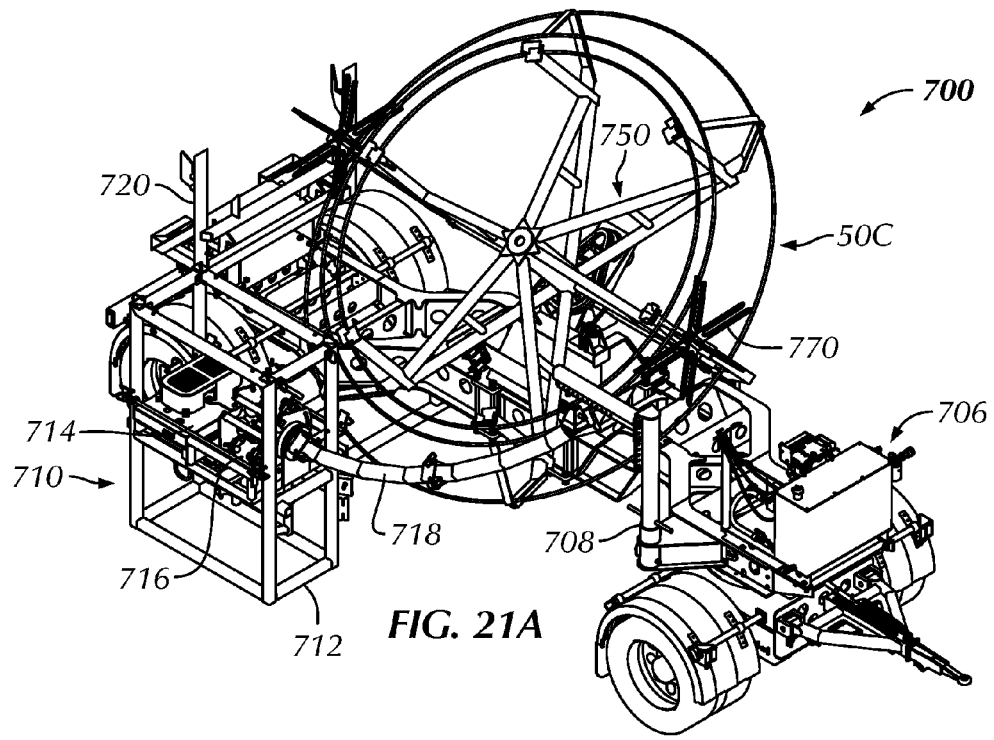
FIGS. 21A-21B show perspective views of the transport trailer with first transfer components ready for unloading or loading rod on one of the transport reels.
Figure 21B:
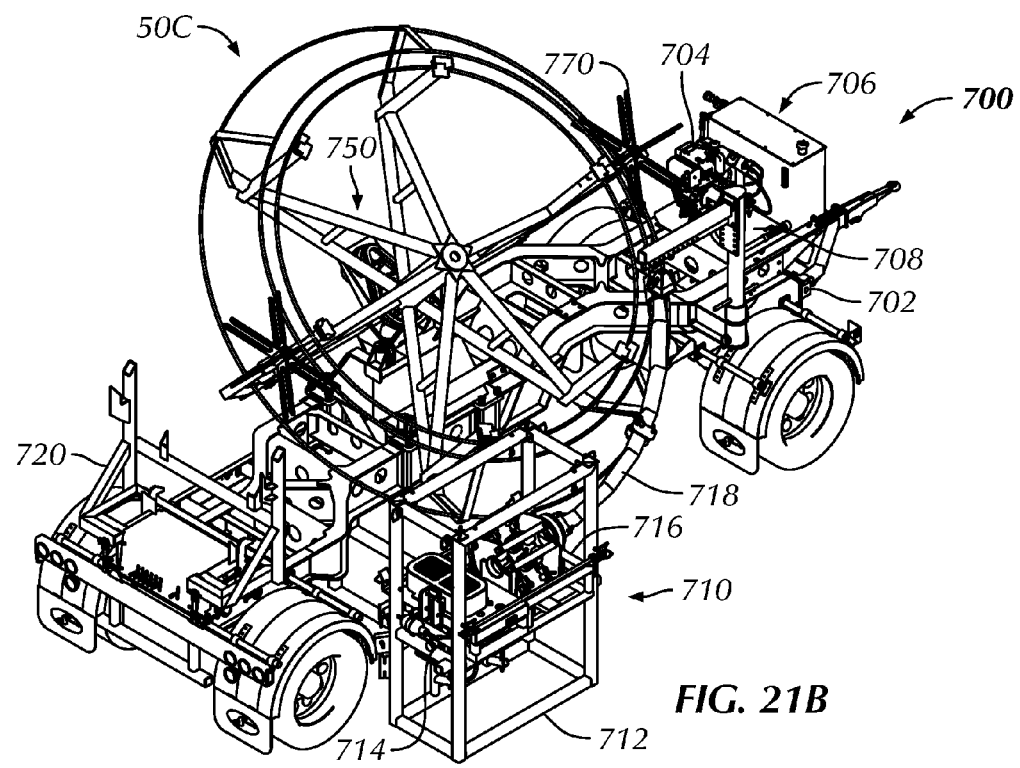
Figure 22A:
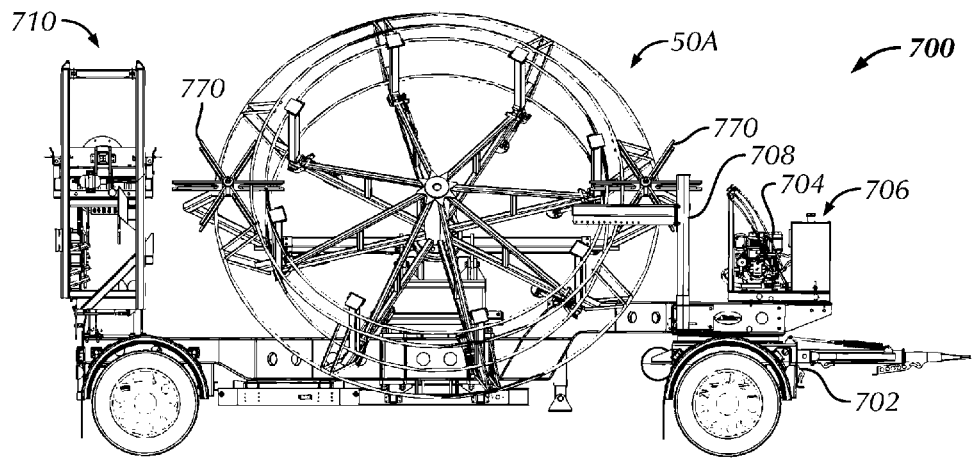
FIGS. 22A-22B show side views of the transport trailer with a modular transport reel and the first transfer components.
Figure 22B:
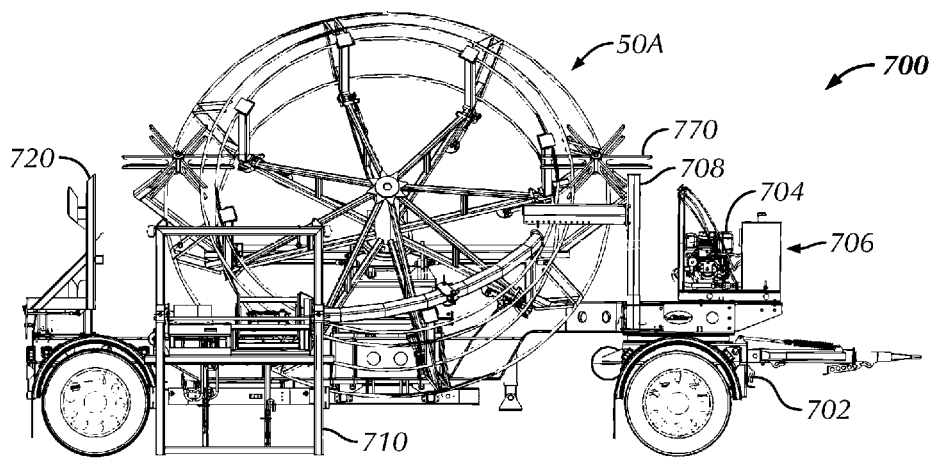
Figure 23:
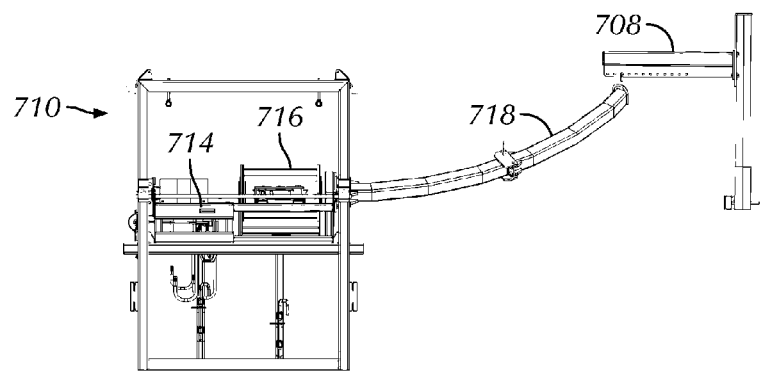
FIG. 23 shows a side view of the first transfer components.

As noted previously, operators transport the reels disclosed herein using various forms of transportation. Once the reels reach a distribution center, the reels can be transported to a wellsite so the rod can be installed and used in a well. As shown in FIGS. 20A-20B, transporting and deploying the rod at an installation site uses a dedicated trailer 700. The trailer 700 can meet regular road transport envelopes when transporting a reel 50. As before, the transport reel 50C in FIGS. 20A-20B has a fixed cage and frame arrangement, but the trailer 700 can also hold the modular reel 50A discussed previously, as shown for example in FIG. 22A.

The trailer 700 has a trailer body 702 with wheels and a pedestal 750 disposed thereon. The transport trailer 700 also has a power system 704, a hydraulic system 706, a guide arm 708, and a deployment unit 710. The pedestal 750, which is described in more detail later, affixes to the trailer's body 702 and supports the reel 50 at a slanted angle. When used, the pedestal 750 can articulate the reel 50 on the body 702 and can control rotation of the reel 50.

The power system 704 can use an electric motor, combustion engine, or the like. The hydraulic system 706 has a reservoir, a pump, valves, and other hydraulic components. The power system 704 situates at the front of the trailer 700 and provides power for the hydraulic system 706. On the back of the trailer 700, a deployment unit support 720 retains the deployment unit 710, which can be removed from the trailer 700. The deployment unit 710 includes a frame 712 that supports a transport unit 714, a rod bender unit 716, and a guide tube 718.

1. Deployment Unit

The transport trailer 700 carries the small reel 50 from a distribution center to a well site. To ready the transport trailer 700 for unloading or loading rod on the reel 50, operators remove the unit 710 and set it up next to the reel 50. As shown in FIGS. 21A-21B, 22A-22B, and 23, the deployment unit 710 can be lifted from the trailer 700 by a crane (not shown) and set up next to the reel 50 when at an installation site. During operation, the unit 710 acts as an autonomous system to extract the curved rod from the reel 50, straighten the rod, and feed the rod over an extended distance to installation equipment or specific welding equipment. In the other direction, the unit 710 can accept the rod from the installation equipment, curve it, and spool the rod back into the transport reel 50.

As shown, the guide tube 718 connects to the guide support 708 and assembles to the rod bender unit 716. The guide support 708 attached to the trailer body 702 can be moved relative to the slanted reel 50 to guide rod into and out of the reel 50.

When operated, the trailer 700 and deployment unit 710 feed the continuous rod (described previously) into the guide tube 718, through the bender unit 716, and out the small transfer unit 714. Along the rod's path, for example, the bender unit 716 seeks to sufficiently straighten the rod, which has a deformed curvature from being stored in the reel 50.

Eventually, the rod can feed to a gripper system positioned above the wellhead. Such a gripper system can take over the transport of the rod to install it into or out of the well. However, the deployment unit 710 straightens/bends the rod. The hub motor (756; FIG. 26C) of the pedestal 750 deals with the inertia of the rotating reel 50C on the trailer 700.

The transfer unit 714 can have a roller system with two driven rollers opposing one another or can have a chain gripping system. The bender unit 716 can have opposing rollers to deform (bend) the rod as desired. The orientation of the bender unit 716 may or may not be adjustable so that the bending that it applies can align with the bend of the rod relative to the reel 50.

The deployment unit 710 also accepts the rod returned from the well to the transport reel 50. In this direction, the unit coils the rod back into the small transport reel 50. This deployment unit 710 can also deliver the rod end of the coiled rod to a welder system positioned at a distance from the wellhead and can return the rod end with the added on features back to the reel 50.

Figure 24A:
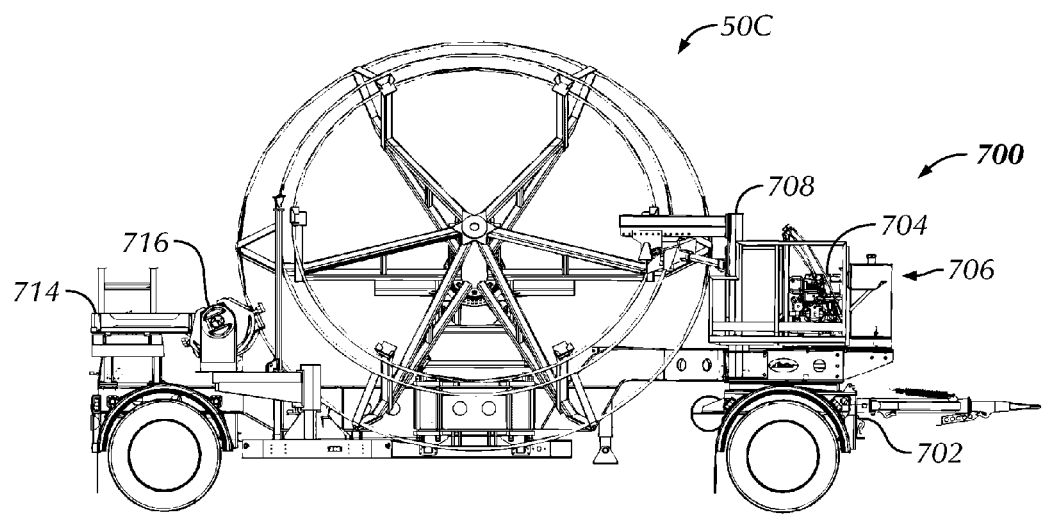
FIGS. 24A-24B show side views of the transport trailer with the transport reel and the second transfer components.
Figure 24B:
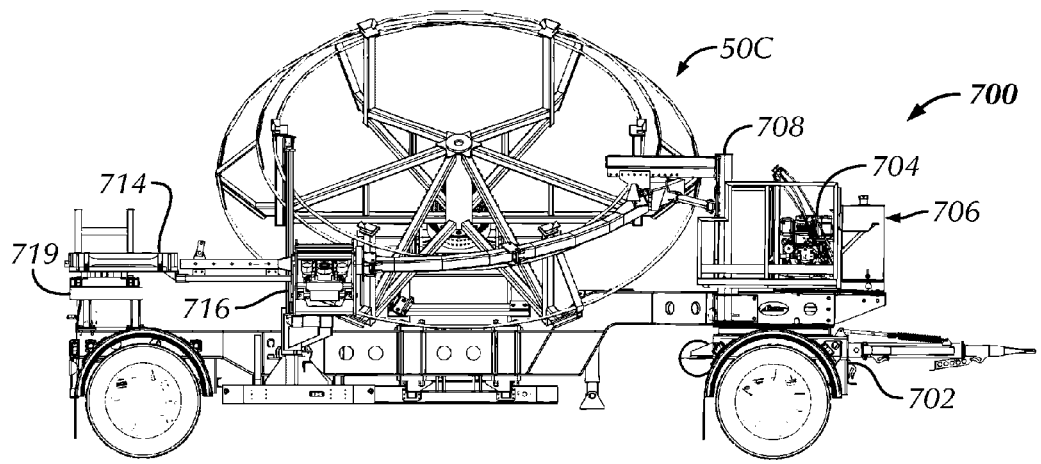
Figure 25:
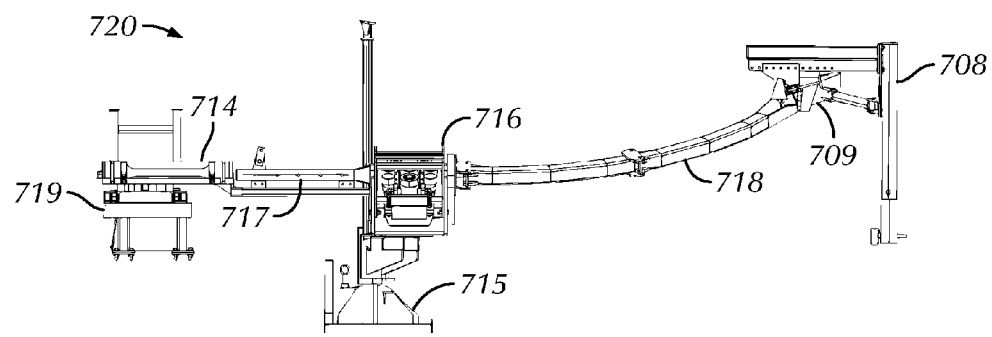
FIG. 25 shows a side view of second transfer components.

In another configuration shown in FIGS. 24A-24B and 25, the bender unit 716 installs on a linkage 715. As shown, the linkage 715 can swing the bender unit 716 from a transport position (FIG. 24A) to an operating position (FIG. 24B) so the bender unit 716 can connect by the guide tube 718 to the guide support 708. At the guide arm 708, a director 709 can connect to the guide tube 718 to facilitate travel of the rod between the reel 50C and the guide tube 718.

The transfer unit 714 can slide out from a transport position (FIG. 24A) to an operating position (FIG. 24B) on a platform 719 installed on the trailer 700. The transfer unit 714 slides out independent of the bending unit 716, and an intermediate guide tube 717 connects the bending unit 716 to the transfer unit 718. Again, the orientation of the bender unit 716 may or may not be adjustable so that the bending that it applies can align with the bend of the rod relative to the reel 50C.

Alternatively, the transfer unit 714 and the bender unit 716 can be connected to each other such that they can be deployed together by a single action, such as pivoting on a linkage. Moreover, the units 714 and 716 can be deployed so that there is as little space between them as practical. In general, deployment of the transfer unit 714 and the bender unit 716 for any of the various configurations can be achieved manually or automatically (i.e., using a hydraulic actuator or the like).

Figure 26A:
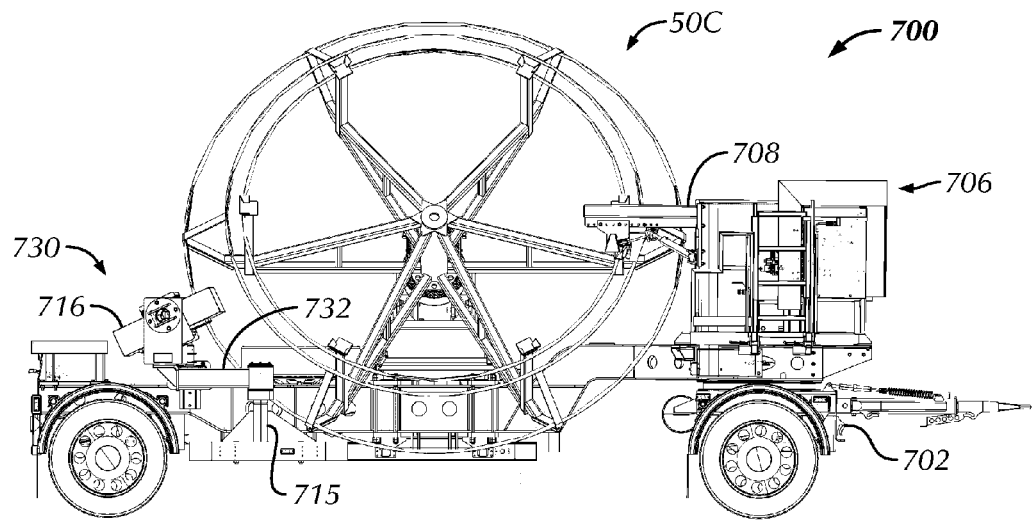
FIGS. 26A-26B show side and perspective views of the transport trailer with the transport reel and third transfer components.
Figure 26B:
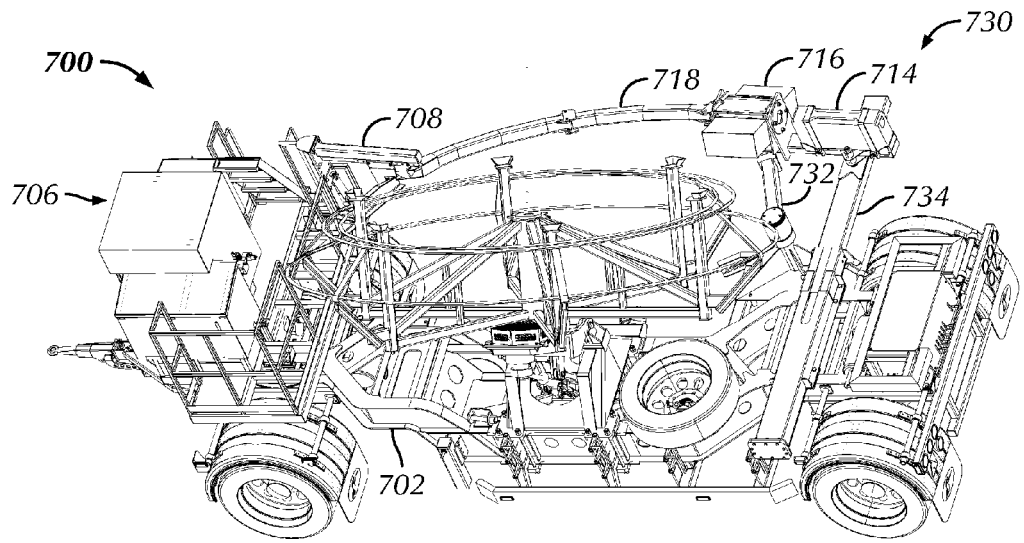

For example, FIGS. 26A-26B show side and perspective views of the transport trailer 700 with the transport reel 50C and third transfer components 730. In this arrangement, the bender unit 716 installs on an arm 732 connected to a linkage 715 on the trailer 700. The bender unit 716 can pivot on the arm 732, and the arm 732 can swing out from the trailer 700 from a transport position (FIG. 26A) to an operating position (FIG. 26B). When swung out, the bender unit 716 can connect by the guide tube 718 to the guide support 708.

The transfer unit 714 installs on a slide 734 that can extend out from the trailer 700. The transfer unit 714 can pivot on this slide 734 and can slide out from a transport position (FIG. 26A) to an operating position (FIG. 26B). The bender unit 716 and transfer unit 714 are coupled together, and they move in tandem between transport and operating positions. This allows for a single action (manual or automatic) to move the transfer components 730 and keeps the distance between the units 714 and 716 to a minimum. Again, the orientation of the bender unit 716 may or may not be adjustable so that the bending that it applies can align with the bend of the rod relative to the reel 50C.

2. Pedestal

Figure 27A:
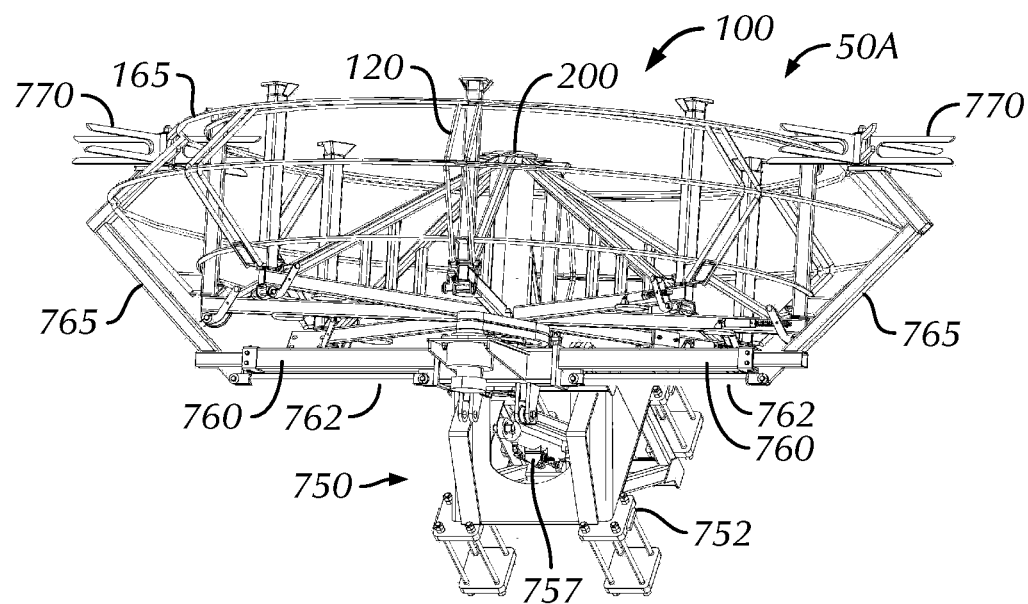
FIGS. 27A-27C illustrate a modular transport reel disposed on a support according to the present disclosure.
Figure 27B:
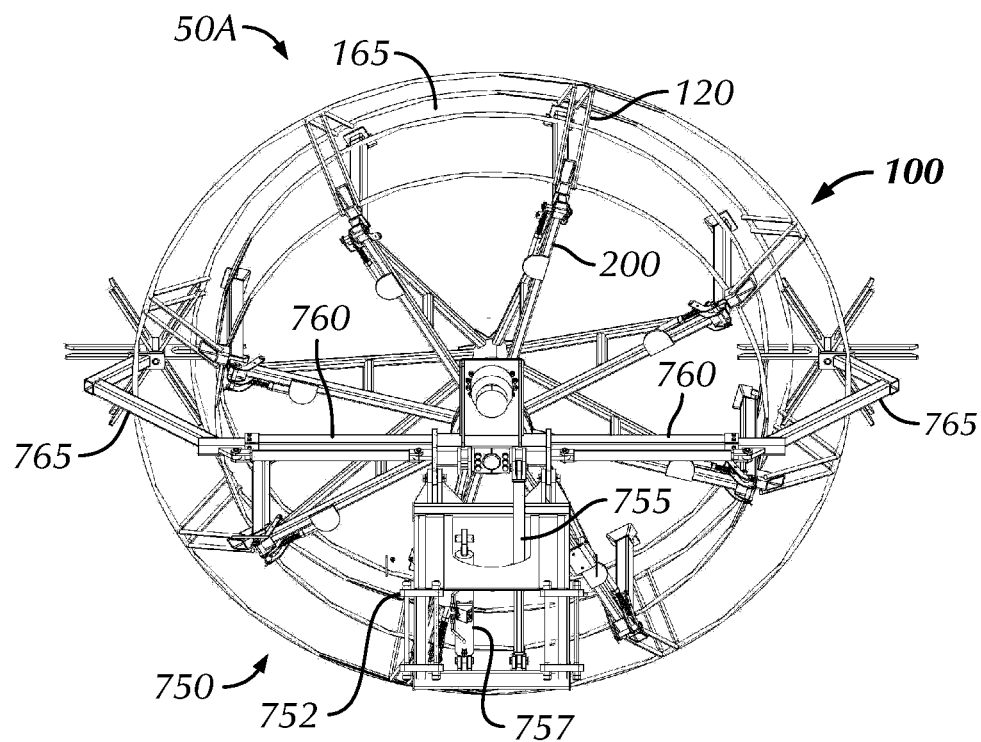
Figure 27C:
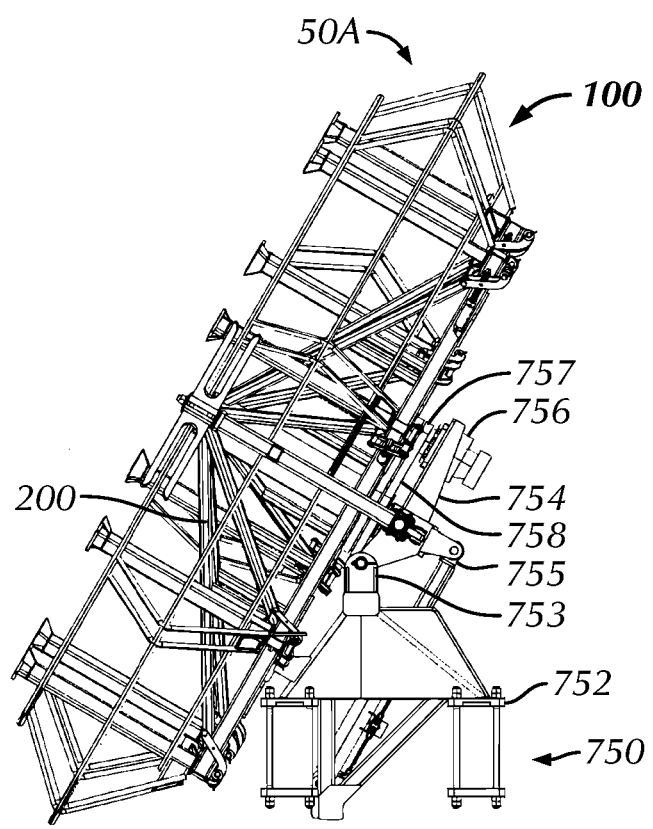

Turning to details of the pedestal 750, FIGS. 27A-27C show various views of the pedestal 750 with a reel mounted thereon. In this example, the reel is actually a modular reel 50A as described previously and having separable cage 100 and frame 200, although as disclosed herein a fixed reel could also be used.

The pedestal 750 on which the reel 50A mounts has a base 752 with an articulating mount 754. In general, the base 752 can affix or mount in a number of ways on the transport vehicle. As shown in previous Figures, the base 752 can attach to I-beams on the trailer's body (702).

The mount 754 connects by pivots 753 to the base 752, which allows the mount 754 with reel 50A to articulate. A telescoping support bar 755 is shown in FIGS. 27A-27C connected between the base 752 and the mount 754. This telescoping support bar 755 can be extended or collapsed to the desired length and then pinned in place to support the orientation of the mount 754. To pivot the mount 754, the piston 757 connects between the base 752 and mount 754 to articulate the mount 754 hydraulically when the bar 755 is unpinned.

As shown in FIGS. 27A-27C, the articulating mount 754 can pivot relative to the base 752 so the angle of the reel 50A can be changed as needed during operation. A hub motor 756, such as a hydraulic or electric motor, couples to the reel hub 758 by a belt or drive 757. This hub motor 756 can actively rotate the reel 50A and control the speed of rotation for the reel 50A during operation. If needed, the motor 756 can also turn freely. In any event, an integrated brake (not visible) can be used to brake the rotation of the reel 50A. These and other arrangements can be used for the rotation of the reel 50A.

Side arms 760 extend from opposite sides of the articulating base 754. The arms 760 include upward angled elbows 765 that fit around the edge of the reel 50A. These angled elbows 765 can move in and out of the fixed arms 760 to install, enclose, and remove the reel 50A. Pistons 762 connect to the elbow 765 and the arms 760 to position the elbows 765 in place.

3. Gates

Gates can be used as the rod is wound out of (and into) the reel 50 on the trailer 700 to selectively close and open the slot around the top of the reel 50. As shown in FIGS. 27A-27B, for example, the elbows 765 can have posts on their tips on which forked wheels 770 can be provided to close off the open slot 165 around the top of the reel 50A.

As the reel 50A turns on the pedestal 750, the outer uprights 120 on the reel's cage 10 intermittently engage blades of the forked wheels 770 on the opposing side arms 760. (As shown previously in FIGS. 20A-20B, for example, the same is true for the fixed form of cage 50C). As the reel 50A turns, the blades of the wheel 770 consistently cover the open slot 165 defined around the reel 50A where the rod is intended to pass out of the cage 100. By keeping portions of this slot 165 covered, the blades of the wheel 770 can keep the rod inside the cage 100. As described below, other devices can be used to close the cage's slot 165 to prevent premature escape of the rod from the reel.

Figure 28A:
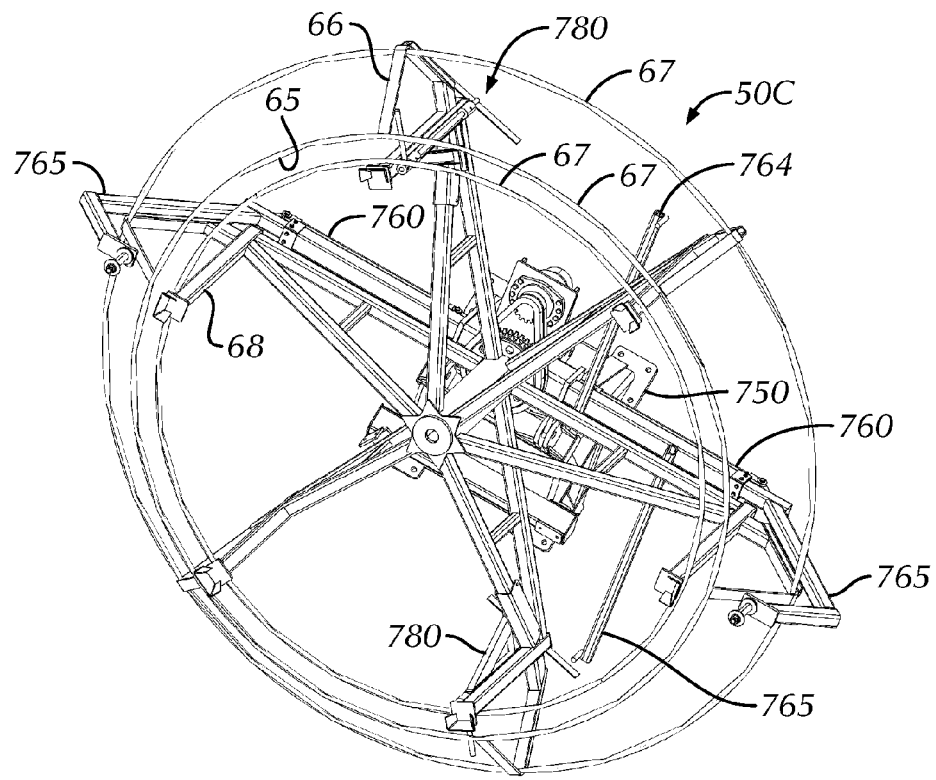
FIGS. 28A-28B illustrate the transport reel disposed on a support with another closure device according to the present disclosure.
Figure 28B:
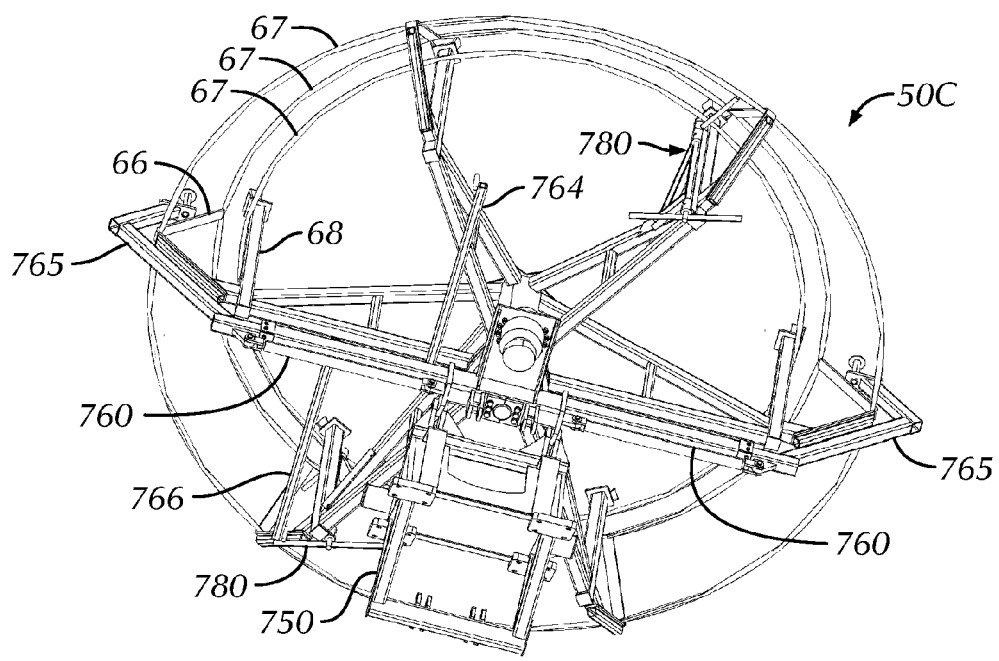
Figure 29:
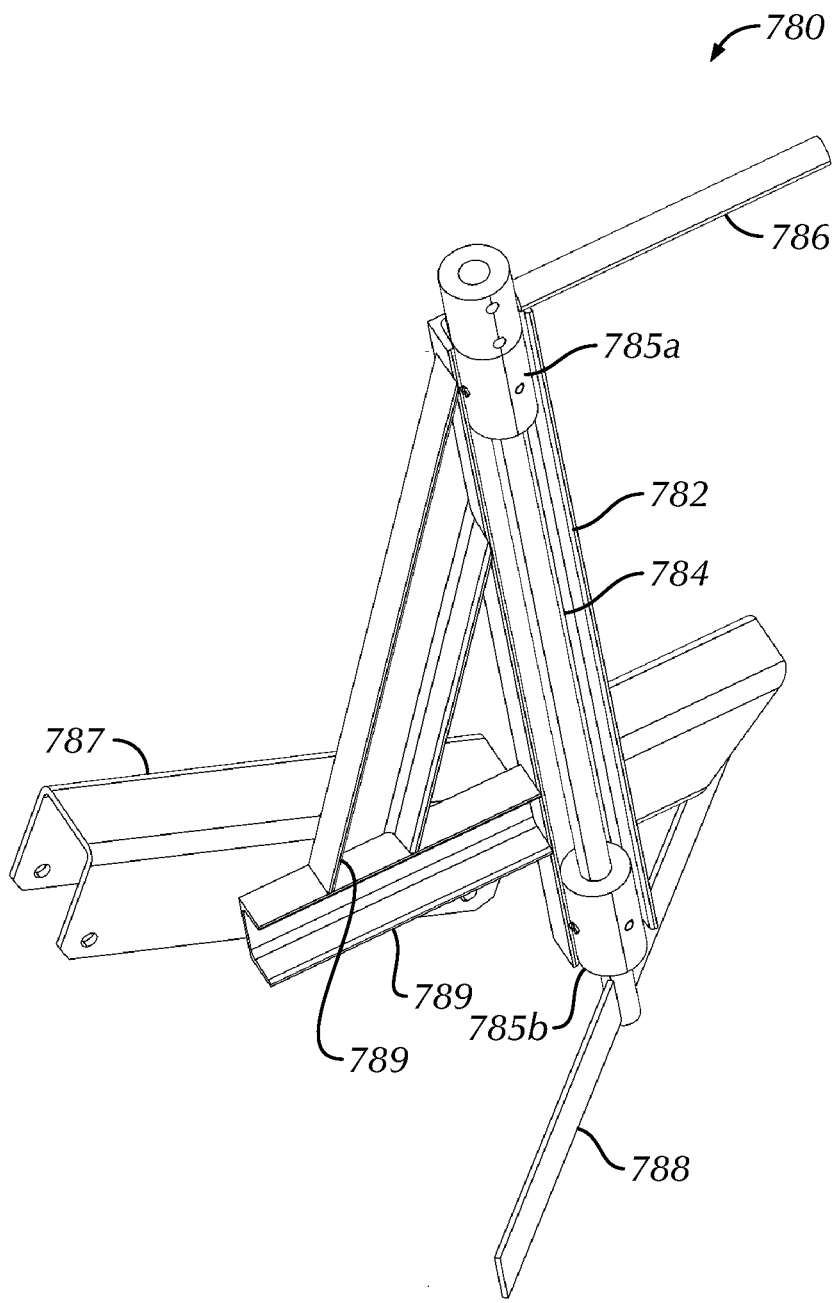
FIG. 29 shows the closure device for intermittently maintaining the opening in the reel closed off during operation.

As shown in FIGS. 28A-28B, a transport reel (in this example fixed 50C, although a modular reel could be used) is equipped with passive gates 780 at the cage's open slot 65. These passive gates 780 selectively open and close due to the rotation of the transport reel 50. As shown, at least two of the inner uprights 68 on the reel 50C have gates 780 mounted thereon. As shown in more detail in FIG. 29, the gate 780 includes an upward stem 782 that fits adjacent the reel's inner upright (68). A bracket member 787 connects by frame elements 789 to the upward stem 782. The bracket 787 fits onto the angled bar of the reel's arm (64). The upward stem 782 has an axle 784 between upper and lower joints 785a-b that allow the axle 784 to rotate relative to the stem 782. The axle 784 has a cross bar 786 on its upward end and has a fan bar 788 on its lower end.

These gates 780 provide a defined opening of the cage's open slot 65 for the passage of rod into and out of the transport reel 50C. As shown in FIGS. 28A-28B, two bars 764/766 extend in opposite directions from one of the pedestals side arms 760. The bars 764/766 are offset from one another, and each has an upward projecting tip. As the reel 50C rotates on the pedestal 750, the gates 780 on the reel 50C move relative to these bars 764/766. Eventually, one of the fan bars 788 on one of the gates 780 engages the tip on one of the bars 764. This turns the fan bar 788 and the connected cross bar 786 to open the slot 65 at this portion around the reel 50C. Eventually, as the reel 50C turns, the same fan bar 788 on this gate 780 engages the tip on the other bar 766. This again turns the fan bar 788 and the connected cross bar 786, which closes over the slot 65 at this portion around the reel 50C.

With two or more gates 780, a section of the slot 65 can be opened around the reel 50C as it turns on the pedestal 750 while the remainder stays covered by the gates 780. Thus, the gates 780 can prevent premature escape of the rod from the reel 50C. These gates 780 can be used in place of or in addition to other closure devices, such as the forked wheels 770.

Various measurements have been provided herein. Due to the nature of how the cages and removable hubs are made, the values of these measurements may vary within acceptable tolerances suitable to the constructed reel and its use. For example, measurements provided herein can vary by several inches either way, yet still be suitable for the implementation.

The foregoing description of preferred and other embodiments is not intended to limit or restrict the scope or applicability of the inventive concepts conceived of by the Applicants. Various features related to one embodiment disclosed herein can be combined or exchanged with features related to another embodiment disclosed herein with the benefit of the present disclosure. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A system for transporting continuous rod, the system comprising:
    a reel for holding the continuous rod coilable about a center of the reel, the reel defining a diameter less than or equal to approximately 168-in; and
    a transport comprising a stand supporting the reel thereon at an angle within a transport space limited by a height less than or equal to 137-in and a width less than or equal to 96-in.

2. The system of claim 1, wherein the stand comprises at least one shelf extending from an angled wall and supporting the reel thereon.

3. A system for transporting continuous rod, the system comprising:
    a reel for holding the continuous rod coilable about a center of the reel, the reel defining a diameter less than 216-in; and
    a transport comprising a stand supporting the reel at an angle thereon within a transport space limited by a height and a width, wherein the stand comprises:
        a base;
        a platform pivotably connected to the base and supporting the reel thereon;
        at least one support removably disposing between the platform and the base and holding the platform to support the reel at the angle relative to the base; and
        a plurality of arms connected to the platform and pivotable inward to the platform around an edge of the reel.

4. The system of claim 3, wherein the platform is collapsable against the base, and wherein the arms are pivotable outward from the platform.

5. The system of claim 3, wherein ends of the arms affix to one another across the reel supported on the platform.

6. The system of claim 3, wherein the platform comprises a mount to which a hub of the reel affixes.

7. The system of claim 3, wherein the transport further comprises a trailer supporting the stand having the reel.

8. The system of claim 7, comprising a plurality of the stand each having one of a plurality of the reel and being transportable with the trailer.

9. The system of claim 7, comprising a plurality of the stand without one of a plurality of the reel being stackable on one another and being transportable with the trailer.

10. The system of claim 3, wherein the diameter of the reel is equal to or less than approximately 168-in, and wherein the stand supports the reel thereon within the transport space limited by the height less than or equal to 137-in and the width less than or equal to 96-in.

11. The system of claim 1, wherein the transport further comprises a flat rack container supporting the stand having the reel.

12. The system of claim 1, wherein the reel comprises a cage for holding the continuous rod and comprises a removable hub for rotating the cage, the removable hub being positionable in the center of the reel and being removably attachable to the cage.

13. The system of claim 12, wherein the cage is transportable on the transport without the removable hub.

14. The system of claim 1, wherein the transport comprises a trailer supporting the reel within the transport space.

15. A system for transporting continuous rod, the system comprising:
   a reel for holding the continuous rod coilable about a center of the reel, the reel defining a diameter less than 216-in; and
   a transport supporting the reel within a transport space limited by a height and a width, wherein the transport has a transport surface and comprises:
   a base disposing on the transport surface;
   a platform pivotably connected to the base and supporting the reel for the continuous rod thereon;
   at least one support removably disposing between the platform and the base and holding the platform at an angle relative to the base; and
   a plurality of arms connected to the platform and pivotable inward to the platform around an edge of the reel.

16. The system of claim 15, wherein the platform is collapsable against the base, and wherein the arms are pivotable outward from the platform.

17. The system of claim 15, wherein ends of the arms affix to one another across the reel supported on the platform.

18. The system of claim 15, wherein the platform comprises a mount to which a hub of the reel affixes.

19. The system of claim 15, wherein the base and the platform form a stand for supporting the reel, and wherein the transport comprises a trailer having a bed as the transport surface such that the stand is transportable with the trailer.

20. The system of claim 19, comprising a plurality of the stand each having one of a plurality of the reel and being transportable with the trailer.

21. The system of claim 19, comprising a plurality of the stand each without one of a plurality of the reel, the stands being stackable on one another and being transportable with the trailer.

22. The system of claim 15, wherein the diameter of the reel is less than or equal to approximately 168-in; and wherein the system supports the reel within the transport space limited by the height less than or equal to 137-in and the width less than or equal to 96-in.

23. The system of claim 15, wherein the transport further comprises a flat rack container supporting the base and the platform.

24. The system of claim 15, wherein the reel comprises a cage for holding the continuous rod and comprises a removable hub for rotating the cage, the removable hub being positionable in the center of the reel and being removably attachable to the cage.

25. The system of claim 24, wherein the cage is transportable on the transport without the removable hub.

26. The system of claim 15, wherein the transport comprises a trailer supporting the reel within the transport space.

27. The system of claim 3, wherein the transport further comprises a flat rack container supporting the stand.

28. The system of claim 3, wherein the reel comprises a cage for holding the continuous rod and comprises a removable hub for rotating the cage, the removable hub being positionable in the center of the reel and being removably attachable to the cage.

29. The system of claim 28, wherein the cage is transportable on the transport without the removable hub.

30. The system of claim 3, wherein the transport comprises a trailer supporting the reel within the transport space.

* * * * *